(12) United States Patent
Barber et al.

(10) Patent No.: US 6,875,966 B1
(45) Date of Patent: Apr. 5, 2005

(54) PORTABLE INDUCTION HEATING TOOL FOR SOLDERING PIPES

(75) Inventors: John P. Barber, Dayton, OH (US); Robert C. Cravens, II, Beavercreek, OH (US); Antonios Challita, Bellbrook, OH (US); Susan A. Stanton, Sunbury, OH (US)

(73) Assignee: Nexicor LLC, Loveland, OH (US)

( * ) Notice: Subject to any disclaimer, the term of this patent is extended or adjusted under 35 U.S.C. 154(b) by 0 days.

(21) Appl. No.: 10/800,540

(22) Filed: Mar. 15, 2004

(51) Int. Cl.[7] .............................................. H05B 6/14
(52) U.S. Cl. ..................... 219/616; 219/633; 219/618; 219/620; 219/673; 219/676; 228/51
(58) Field of Search ................................ 219/607, 611, 219/615–618, 633–635, 643, 670, 672–676; 156/272.2, 379.6, 380.2; 228/51

(56) References Cited

U.S. PATENT DOCUMENTS

| | | |
|---|---|---|
| 2,427,747 A | 9/1947 | Schneider et al. |
| 2,434,867 A | 1/1948 | Rudd |
| 2,477,129 A | 7/1949 | Johnson |
| 2,484,650 A | 10/1949 | Ross, Jr. |
| 2,684,425 A | 7/1954 | Vickland |
| 2,886,690 A | 5/1959 | Crawford |
| 3,076,884 A | 2/1963 | Crawford |
| 3,094,452 A | 6/1963 | Von Riegen et al. |
| 3,238,346 A | 3/1966 | Savko |
| 3,260,792 A | 7/1966 | Kreisel |
| 3,365,563 A | 1/1968 | Basinger |
| 3,428,769 A | 2/1969 | Ciszewski et al. |
| 3,472,987 A | 10/1969 | Viart |
| 3,648,005 A | 3/1972 | Rudd |

(Continued)

FOREIGN PATENT DOCUMENTS

| | | |
|---|---|---|
| EP | 1 087 191 A1 | 3/2001 |
| FR | 0 369 893 | 11/1989 |
| GB | 2 047 150 A | 11/1980 |
| GB | 2 330 100 A | 4/1999 |
| JP | 6-114545 | 4/1994 |
| JP | 6-297137 | 10/1994 |
| JP | 7-009119 | 1/1995 |
| JP | 7-009120 | 1/1995 |
| JP | 2000200678 A2 | 7/2000 |
| RU | 2145468 C1 | 2/2000 |
| WO | WO 90/04490 | 5/1990 |

OTHER PUBLICATIONS

"Nova Star 2 RF Power Supply," Ameritherm Inc., sales brochure, 2 pages (Jun. 13, 2003).
"Induction Heating Solutions," RDO Enterprises, sales brochure, 2 pages (no date).

*Primary Examiner*—Philip H. Leung
(74) *Attorney, Agent, or Firm*—Frederick H. Gribbell, LLC

(57) ABSTRACT

A portable induction tool is provided for soldering or brazing sections of metal pipe together. A work coil head (with induction coil) is U-shaped, allowing placement of the head around lengths of pipe, heating a susceptor (e.g., the pipe) to form a joint, and then to be withdrawn after the pipe joint is made. In one form, the tool uses heat pipes to remove thermal energy from the head, and also a heat exchanger for higher-powered units. Power capacitors are generally included with the induction (work) coil to create a tank circuit of a resonant frequency. The induction coil uses Litz wire, copper tubing, or heat pipes with a conductive outer skin to carry the high-current being delivered to the induction coil. The induction coil has a general racetrack configuration, which is typically wound in a U-shape (or as a semicircle) as a single winding, with multiple turns.

52 Claims, 21 Drawing Sheets

U.S. PATENT DOCUMENTS

| | | |
|---|---|---|
| 3,665,138 A | 5/1972 | Edge et al. |
| 3,681,559 A | 8/1972 | Morris |
| 3,689,725 A | 9/1972 | Hammer et al. |
| 3,689,727 A | 9/1972 | Morris |
| 3,907,625 A | 9/1975 | Vogelsanger |
| 3,980,853 A | 9/1976 | Morisaki |
| RE29,016 E | 10/1976 | Peacock |
| 3,996,402 A | 12/1976 | Sindt |
| 4,002,358 A | 1/1977 | Streit |
| 4,123,305 A | 10/1978 | Krzeszowski |
| 4,195,865 A | 4/1980 | Martin |
| 4,197,441 A | 4/1980 | Rudd |
| 4,201,306 A | 5/1980 | Dubois et al. |
| 4,268,736 A | 5/1981 | Cuvelier |
| 4,271,345 A | 6/1981 | Palmer et al. |
| 4,300,031 A | 11/1981 | Reboux et al. |
| 4,355,222 A | 10/1982 | Geithman et al. |
| 4,388,510 A | 6/1983 | Hughes |
| 4,433,227 A | 2/1984 | Brittin |
| 4,443,678 A | 4/1984 | Jacovides et al. |
| 4,454,402 A | 6/1984 | Sander et al. |
| 4,486,641 A | 12/1984 | Ruffini |
| 4,521,659 A | 6/1985 | Buckley et al. |
| 4,532,396 A | 7/1985 | Burack et al. |
| 4,695,712 A | 9/1987 | Busch |
| 4,728,760 A | 3/1988 | Brolin et al. |
| 4,734,552 A | 3/1988 | Brolin |
| 4,845,326 A | 7/1989 | Rudd et al. |
| 4,954,191 A | 9/1990 | Delespaul et al. |
| 5,000,367 A | 3/1991 | Bottum |
| 5,013,878 A | 5/1991 | Fries, Jr. |
| 5,025,125 A | 6/1991 | Peterson |
| 5,113,049 A | 5/1992 | Border et al. |
| 5,193,834 A | 3/1993 | Strozyk |
| 5,254,824 A | 10/1993 | Chamberlain et al. |
| 5,266,764 A | 11/1993 | Fox et al. |
| 5,338,920 A | 8/1994 | Okusaka et al. |
| 5,350,902 A | 9/1994 | Fox et al. |
| 5,352,871 A | 10/1994 | Ross et al. |
| 5,374,808 A | 12/1994 | Coultrip et al. |
| 5,412,184 A | 5/1995 | McGaffigan |
| 5,468,937 A * | 11/1995 | Yokogi ........................ 219/634 |
| 5,500,511 A | 3/1996 | Hansen et al. |
| 5,503,192 A | 4/1996 | Platusich et al. |
| 5,505,898 A | 4/1996 | Goto et al. |
| 5,524,674 A | 6/1996 | Platusich et al. |
| 5,528,019 A | 6/1996 | Shintani et al. |
| 5,543,604 A | 8/1996 | Taylor |
| 5,549,335 A | 8/1996 | Wohrstein |
| 5,571,437 A | 11/1996 | Rudd |
| 5,630,958 A | 5/1997 | Stewart, Jr. et al. |
| 5,714,739 A | 2/1998 | Irrera et al. |
| 5,717,191 A | 2/1998 | Christensen et al. |
| 5,777,299 A | 7/1998 | Dominici |
| 5,786,054 A | 7/1998 | Platusich et al. |
| 5,786,575 A | 7/1998 | Bleske et al. |
| 5,874,713 A | 2/1999 | Cydzik et al. |
| 5,902,507 A * | 5/1999 | Wiezbowski et al. ....... 219/615 |
| 5,916,469 A | 6/1999 | Scoles et al. |
| 5,919,387 A | 7/1999 | Buckley et al. |
| 5,935,475 A | 8/1999 | Scoles et al. |
| RE36,787 E | 7/2000 | Hansen et al. |
| 6,100,696 A | 8/2000 | Sinclair |
| 6,229,127 B1 | 5/2001 | Link |
| 6,316,754 B1 | 11/2001 | Schatz et al. |
| 6,321,046 B1 | 11/2001 | Kikuchi et al. |
| 6,346,690 B1 | 2/2002 | Ulrich et al. |
| 6,378,760 B1 | 4/2002 | Shimizu et al. |
| 6,509,555 B1 | 1/2003 | Riess et al. |
| 2002/0092845 A1 | 7/2002 | Panczner |
| 2002/0139794 A1 | 10/2002 | Budinger |
| 2003/0226838 A1 | 12/2003 | Gust |

* cited by examiner

PORTABLE INDUCTION HEATING TOOL FOR SOLDERING PIPES

TECHNICAL FIELD

The present invention relates to induction heating equipment and is particularly directed to an induction tool of the type which solders or brazes metal pipe sections together. The invention is specifically disclosed as an induction heating system in which a portable unit contains an induction coil (a "work coil") in a U-shaped or semi-circular coil head configuration that allows a user to place the head around an elongated object, such as a run of metal pipe sections, energize the work coil to solder two pipes sections together to form a joint, and then to remove the head from the pipe run. The portable unit is available in various power ratings, and the more powerful portable units can include a heat exchanger and a set of heat pipes to remove thermal energy from the head.

The portable unit contains one or more power capacitors to share reactive electrical current with the induction coil, to minimize the amount of current running through a cable from a power supply to the portable unit. The induction coil is made of Litz wire to minimize power loss and thermal energy generation due to the skin effect of larger conductors; alternatively, the coil may be constructed of copper tubing, or the coil may comprise heat pipes that use a copper outer layer. The coil head includes heat pipes in some of the embodiments, and in the embodiments where the heat pipes do not carry the load current, the physical proximity of the heat pipes to the (induction) work coil causes the heat pipes to receive some of the magnetic field energy produced by the work coil; when determining the physical placement of the heat pipes in this type of coil head, consideration is given to reducing or minimizing the magnetic flux received by the heat pipes.

The coil head includes an inner wall that is U-shaped or semi-circular, and an outer wall. Both types of walls should be at least somewhat abrasion-resistant and heat-resistant. The work coil windings are located between these two sets of walls, and the heat pipes (if they extend into the coil head region) are also located within or between these two sets of walls. The induction coil has a general racetrack configuration, which is typically wound between the U-shaped or semi-circular inner wall and the outer wall as a single winding; there are multiple turns which comprise adjacent conductors that stack up next to one another to create a "wider" coil face. The dimensions of the induction coil have a generally preferred characteristic as compared to the dimensions of the workpiece pipe sections that are to be soldered or brazed together, which is described below in greater detail.

The coil head can be made attachable to and detachable from the remainder of the portable unit at a mounting wall, to allow for heads of various sizes and various power ratings to be interchangeably used in the portable unit. The coil head can also be swivelable, if desired. The mounting wall and outer walls are heat-insulative in some embodiments (those with heat pipes running through the mounting wall into the head), and are somewhat heat-conductive in other embodiments (those with no heat pipes running into the head). The inner wall is typically thermally insulative, particularly at its surface that may come into contact with a workpiece being inductively heated.

The portable unit uses a finger-depressible trigger to actuate an electrical switch, which initiates the "heating event" to make a solder joint or a brazed joint. Alternatively, a foot switch could be used to initiate the heating event, in which the foot switch is located outside the housing of the portable unit. As a further alternative, a different type of switching action could be utilized; for example, the portable unit could be attached to a robotic arm in an automatic manufacturing process control system, and the electrical switch could merely comprise a solid-state relay that is actuated by a remote computer. Or the portable unit could be actuated by a proximity sensor that detects the physical proximity of the coil head to a predetermined type or mass of target material.

A power cable is typically mounted to the portable induction heating tool, either as a "permanent" fixture, or via an electrical plug and receptacle. If a receptacle is used, the power cable plugs into the back of the portable unit, away from the coil head. The power cable carries electrical power and electrical control signals to the portable unit. An alternative "receptacle" for receiving power is an antenna, in which the power is received in the form of electromagnetic energy, and thus no power cable is needed.

The work coil is typically more efficient in inductively heating a cylindrical workpiece when the coil itself is configured in a semi-circular profile, so that it "wraps" around about half of the circumference of the outer surface of the workpiece. If the inner wall is substantially "thin" then the work coil will exhibit an arcuate "length" that is just over one-half the circumference of the workpiece. The work coil is also typically more efficient in inductively heating a cylindrical workpiece when the "thickness" of the work coil (i.e., the distance between the inner and outer walls of the coil head) is about equal to the radius of the workpiece at its outer diameter dimension.

In a typical use of the heating tool of the present invention, two pipe sections are brought together in a co-linear arrangement, and a cylindrical coupler is slid over both pipe sections at the location where they abut one another. A bonding material is made available to create a solid bond between the coupler and each of the pipe sections. The heating tool is brought into a proximal position to the coupler (it can even make physical contact with the coupler), and the work coil is energized, thereby heating the entire coupler and both sets of bonding material, and thus melting the bonding material (assuming it is soldering or brazing compound), then de-energizing the work coil to allow the bonding material to solidify to form a hard bonding joint. (In an alternative mode, the two pipe sections could be bonded directly at their abutting ends, without the use of a coupler.)

BACKGROUND OF THE INVENTION

Induction heating devices have been available for many years, including some that raise the temperature of susceptors containing metallic substances that have eddy currents induced therein when receiving the magnetic field produced by a work coil of the induction heating device. Some of these induction heating devices have been used to connect two sections of pipe together; in some cases the induction heating devices solder the pipe sections together, or even to weld the pipe sections together, in certain high-powered induction devices.

One example induction heating device is disclosed in U.S. Pat. No. 5,374,808 and is used with a "pull test" machine that has a stationary chuck and a moveable chuck that pulls apart two test pieces that previously have been bonded together. The induction heating device has a U-shaped core or "pole piece" that consists of two spaced-apart opposite ends that define an air gap therebetween. An induction coil is wrapped around the U-shaped pole piece, thereby forming an induction coil with a magnetic core. A capacitor is connected to opposite ends of the induction coil to create a tank circuit, and a power oscillator can be used to adjust the power level and frequency of electrical energy that is supplied to the tank circuit. In general, this induction heating device is used to test the strength of two thermally non-conductive test pieces that have been bonded together. It is not being used to solder or weld two pieces together.

Another patent, U.S. Pat. No. 5,412,184, discloses an induction heating tool that is shaped like a jaw-like cylinder. The jaws contain electrical conductors that provide inductive heat (as a magnetic field) when energized, and the jaws have a curved cross-section that brings the two edges of the jaw-like structure into contact after being wrapped around a pipe or other cylindrical object that is to be heated. There are inner surface and outer surface conductors that are connected in a manner so that their current flows will be in opposite directions to reduce the electromagnetic radiation that is external to the device. One of the embodiments (see FIG. 7) uses a pistol grip to pull the jaws together around the pipe to be heated.

Another patent, U.S. Pat. No. 5,350,902, discloses an induction heating device that has a handle with a hollow interior, a "wrist" connected to one end of the handle, a U-shaped pole piece having two spaced-apart ends, a tank circuit including an induction coil wrapped around the pole piece, and a capacitor connected to the induction coil. There is also a "head" connected to the wrist that includes a housing for receiving the U-shaped pole piece, in which the two spaced-apart ends of the pole piece extend outwardly beyond the housing. A susceptor is to be placed in juxtaposition to the ends of the U-shaped pole piece, and the susceptor is heated by magnetic flux passing between the two ends of the pole piece. The wrist provides an articulating mount for the head, in which the wrist provides multiple degrees of freedom of motion so the head can swivel about two joints, which are essentially ball and socket members.

U.S. Pat. No. 5,786,575 discloses a "wrap tool" that has first and second coil regions and flange regions for inducing oscillating magnetic fields to fuse a plastic coupling to a substrate. The flange regions of the wrap tool open to receive a pipe, and then close to surround the pipe before a heating event, in which the pipes will be melted and fused together.

U.S. Pat. No. 4,521,659 discloses an induction heating gun that can fuse thermoplastics using an alternating current that passes through a tank circuit, in which the inductor member of the tank circuit is wrapped around a curved pole piece of a ferromagnetic material. The magnetic flux in the induction coil flows to the ends of the pole piece and into a screen placed between the materials to be joined, and the flux induces a current in the screen which generates heat to melt the thermoplastics together.

U.S. Pat. No. 3,428,769 discloses an induction heating tool for welding or brazing tubes, in which the heating tool has an overall shape of a pliers-type tool that clamps around the tube to be heated. The clamping action is by use of two separate jaws.

Published patent application Ser. No. 2003/0226838 A1 discloses a magnetic welder that provides an induction coil to heat a set of metal workpieces sufficiently to form a weld bond. The induction coil has a movable element that, when "opened," forms a gap to allow the coil to be placed over the workpieces, and after the coil has been moved into position, the movable element "closes" to circumscribe the workpieces. The magnetic welder exhibits an insulated handle that includes a trigger that actuates the magnetic field. The induction coil can also have a locking mechanism that may be used to lock the coil in its closed position.

Some of the conventional inventions use flexible coil members to allow the induction coil to be essentially "wrapped" around the workpiece, or to be bent into a desired shape with respect to a workpiece. Patents describing such an arrangement include U.S. Pat. No. 6,346,690, U.S. Pat. No. 5,412,184 (noted above), U.S. Pat. No. 5,352,871, U.S. Pat. No. 5,266,764, U.S. Pat. No. 5,113,049, U.S. Pat. No. 4,695,712, U.S. Pat. No. 4,388,510, and U.S. Pat. No. 3,260,792.

Others of the conventional inventions use coils that are liquid-cooled, in which the induction coil is hollow, and a cooling fluid is directed through the hollow coil to take heat away from the energized coil. Patents describing such an arrangement include U.S. Pat. No. 4,271,345 and 3,365,563.

As noted above, there are several conventional inventions that use an induction coil that "opens" to receive a workpiece (as a "side-entry"), and then "closes" to essentially surround the workpiece for the heating event. Other patents describing such an arrangement include U.S. Pat. No. 5,874,713, U.S. Pat. No. 5,786,575, and U.S. Pat. No. 3,365,563.

One variation if the conventional inventions is a side-entry induction coil, in which the coil itself does not necessarily move to allow a workpiece to be inserted into a heating area or heating zone. However, a "flux concentrator" is provided at the mouth of the coil which is made of ferrite material, and which is movable between a "loading" position (i.e., an open position) and a "heating position" (i.e., a closed position). This arrangement is disclosed in U.S. Pat. No. 5,630,958. This arrangement is different than the movable coil inventions; nevertheless there is a movable magnetic circuit member that has an open position and a closed (healing) position.

It would be an improvement to provide an induction heating tool that is capable of soldering or brazing metal pipes together without force-cooling liquid running through the induction coil conductors, or alternatively using heat pipes as the induction coil conductors, and moreover by using a very portable induction heating tool in which the induction coil is easily placed around portions of a cylindrical object (such as two pipes), without having to "wrap" or "close" the induction coil windings around the pipes, and without needing a separate magnetic circuit member to be moved from an open (loading) position to a closed (heating) position.

SUMMARY OF THE INVENTION

Accordingly, it is an advantage of the present invention to provide an induction heating apparatus having an induction work coil located in a coil head to solder or braze together cylindrical metallic objects, such as metal pipes, in which the coil head has a shape that allows easy insertion around the pipe sections, and can be easily removed once the pipes have been joined.

It is another advantage of the present invention to provide an induction heating apparatus in which an induction work coil is included in a coil head that has a U-shape or semi-circular shape that can be easily inserted around cylindrical objects such as pipes, and in which the electrical energy is delivered to a tank circuit that includes the work coil and a set of power capacitors, to lower the real AC electrical power required for delivery to the portable unit.

It is a further advantage of the present invention to provide an induction heating apparatus in which an induction work coil is made of Litz wire or electrically-conductive tubing which runs into a coil head, as well as including heat pipes that run into the coil head and transfer heat back to a heat exchanger, all of which is part of the portable induction heating unit, and in which the load current for the induction coil is not carried by the heat pipes.

It is still a further advantage of the present invention to provide an induction heating apparatus in which an induction work coil is made of Litz wire or electrically-conductive tubing which runs into a coil head, as well as including heat pipes that run between a mounting wall and a heat exchanger, in which the coil head is attached to the mounting wall, and heat is transferred through the mounting wall to the heat pipes and to the heat exchanger, all of which is part of the portable induction heating unit, and in which the load current for the induction coil is not carried by the heat pipes.

It is yet a further advantage of the present invention to provide an induction heating apparatus in which an induction work coil is made one or more heat pipes that run into a coil head, in which the heat pipes both transfer heat back to a heat exchanger and carry the load current of the inductive coil itself, all of which is part of the portable induction heating unit.

It is still another advantage of the present invention to provide an induction heating apparatus in which a portable unit can be easily placed around a cylindrical object (such as a pipe), and which includes an induction work coil and power capacitor as a tank circuit, and which also includes a receiving area to receive electrical power to drive the induction coil/power capacitor tank circuit, perhaps via an external cable connected to an electrical receptacle.

It is still a further advantage of the present invention to provide an induction heating apparatus in which a portable unit can be easily placed around a cylindrical object (such as a pipe), and which includes an induction work coil that exhibits a substantially semi-circular profile such that it proximally surrounds about one-half of the outer circumference of the cylindrical object. When energized, the induction coil magnetically couples with the cylindrical object to raise its temperature, and a proximal bonding compound is also raised in temperature to bond one portion of the cylindrical object with a second portion of the cylindrical object. The profile of the induction work coil can alternatively exhibit substantially a U-shape, while also magnetically coupling with the cylindrical object.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an induction heating apparatus is provided, which comprises: (a) a head portion, comprising: (i) an outer wall, (ii) an inner wall, (iii) an induction coil disposed between the inner and outer walls, wherein: (iv) the inner wall forms an opening having substantially a U-shape as its interior surface, (v) the induction coil comprises an electrical inductor, and (vi) the inner wall and the outer wall are substantially rigid, and do not exhibit movable portions with respect to one another; and (b) a gripable portion, comprising: (i) an enclosure surface, (ii) an electrical switching circuit, (iii) a receiving area that receives power for energizing the induction coil, and (iv) at least one electrical conductor to carry the power between the induction coil and the receiving area.

In accordance with another aspect of the present invention, an induction heating apparatus is provided, which comprises: (a) a head portion, comprising: (i) an outer wall, (ii) an inner wall, and (iii) an induction coil disposed between the inner and outer walls, wherein the inner wall forms a surface exhibiting an opening that may be placed such that the inner wall partially surrounds a workpiece, and wherein the induction coil comprises an electrical inductor; and (b) a gripable portion, comprising: (i) an enclosure surface, (ii) an electrical switching circuit, (iii) a receiving area that receives power for energizing the induction coil, (iv) at least one electrical conductor to carry the power between the induction coil and the receiving area; and (v) at least one heat pipe for transferring thermal energy from the head portion.

In accordance with yet another aspect of the present invention, an induction heating apparatus is provided, which comprises: (a) a head portion, comprising: (i) an outer wall, (ii) an inner wall, (iii) an induction coil disposed between the inner and outer walls, wherein the inner wall forms an opening that may be placed so as to partially surround a workpiece, and wherein the induction coil comprises an electrical inductor; (b) a gripable portion, comprising: (i) an enclosure surface, (ii) an electrical switching circuit, (iii) a receiving area that receives power for energizing the induction coil, (iv) at least one electrical conductor to carry the power between the induction coil and the receptacle; and (c) a heat exchanger portion to assist in transferring thermal energy from the head portion.

In accordance with still another aspect of the present invention, a coil head for an induction heating apparatus is provided, which comprises: (a) an outer member; (b) an inner member, the inner member having a first arcuate surface along a first, inner side wall, and a second arcuate surface along a second, outer side wall, the first and second side walls being of a shape such that the inner member exhibits a profile that is substantially semi-circular; and (c) an induction coil disposed between the inner and outer members, the induction coil comprising an electrical winding of a racetrack configuration that is substantially arcuate of a semi-circular profile, such that it is substantially positioned along the second, outer side wall of the inner member; the induction coil exhibiting a length dimension along its substantially semi-circular profile, between a first end and a second end of the induction coil; wherein: when the inner member is moved proximal to a cylindrical workpiece that is to be heated, in which the cylindrical workpiece exhibits a circumference dimension along its outer surface, the length dimension of the induction coil is of a distance that is substantially one-half of the workpiece circumference dimension.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
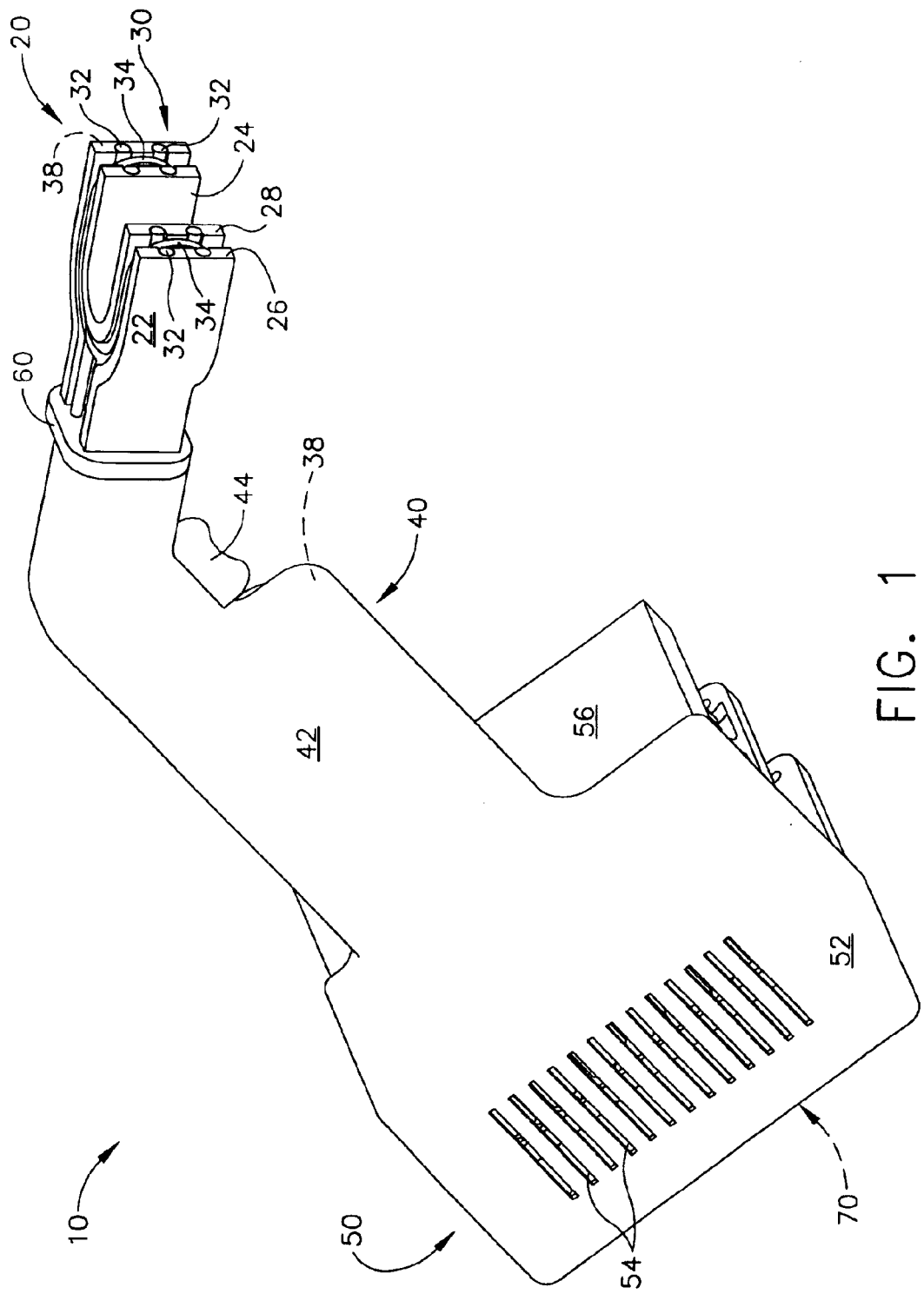
FIG. 1 is a perspective view in partial cross-section of a portable induction heating tool, constructed according to the principles of the present invention, depicting a first embodiment of a relatively high-powered unit that includes heat pipes and a heat exchanger.

Referring now to FIG. 1, a portable (or "hand-held") inductive heating tool that provides magnetic energy using an induction work coil is illustrated, generally designated by the reference numeral 10. The work coil "head" is depicted at the reference numeral 20, and it includes an outer wall 22, an inner wall 24, a set of electrical conductors that make up the induction work coil at 34, and a set of heat pipes at 32. The coil head 20 is attached to a mounting wall member 60, which is then further attached to a mid-portion 40 of the portable heating tool 10. On the other side of the mid-portion 40 is a heat exchanger portion of the tool, generally designated by the reference numeral 50.

In FIG. 1, the inner wall 24 exhibits a somewhat U-shaped appearance, or more accurately, a half-oval shape. This wall's approximate shape will be often referred to herein as a "U-shape," even though it may not look exactly like the letter U. (Note that some other embodiments described below use an inner wall that has a more semi-circular appearance; in other words, the U-shape in some of the other embodiments is a very shallow "U". For purposes of this patent document, the term "U-shape" pertaining to an induction coil or to the inner wall of a coil head will include all of the shapes illustrated in the drawings, and their equivalents, and specifically including the embodiments in which the coil shape is closer to a semicircle than it is to a "U"—see, for example, FIG. 22.)

The shape of the inner wall 24 is designed to be placed partially around a cylindrical object, such as a pipe, and as such it can be easily inserted about, and later removed from, a long length of two pipe sections at a location where a joint is to be formed with the two pipe sections. The tool 10 can thus be used to solder two pipe sections together, or using different materials at a higher temperature, the tool 10 can be used for brazing two pipe sections together. If the inner wall is of a material that can withstand a relatively high temperature (e.g., about 260 degrees C. for soldering, or 800–900 degrees C. for brazing) at least momentarily, then the inner wall 24 can be designed of a shape and dimension so as to directly make mechanical contact with the workpiece (e.g., the pipe segments) during the heating event that will solder or braze the segments together. This configuration is a preferred form of the present invention.

It should be noted that it is the inner surface of the inner wall 24 that must be able to withstand the maximum temperatures of the heating operation, since the inner surface is the portion that will make direct contact with the workpiece. If the inner wall 24 is made of a layered material, then the innermost layer would typically exhibit the highest temperature rating, and would typically comprise a thermal insulative material. The other layers of such a layered inner wall 24 could exhibit somewhat lower temperature ratings, and could comprise materials that are thermal conductors, if desired. Of course, the outermost surface of the inner wall 24 must still be able to withstand direct contact with the induction coil 34, which will tend to be raised in temperature as it conducts current.

The induction coil 34 (sometimes referred to herein as a "work coil") also is sized and shaped to partially surround the workpiece (e.g., the unjoined pipe sections), and when induction coil 34 is energized, it causes the workpiece and the adjacent solder or brazing compound to be raised in temperature to a sufficient extent that the entire circumferential area of a round workpiece is appropriately heated, thereby ensuring a good bond around the entire diameter of a round (cylindrical) set of pipe sections, for example. Induction coil 34 is typically an electrical inductor. It will be understood that an ideal inductor comprises a pure inductance, with no resistance or capacitance; however, an actual inductor will exhibit some resistance and capacitance, along with its main inductance property. The resistance of the induction coil causes certain power losses, which typically cause heat to be generated by the coil when electric current flows therethrough. The heat created by these power losses is an important factor that should be accounted for in the design of a portable induction heating tool, such as that of the present invention. This heat is typically dissipated by the tool's thermal management system, which is discussed herein for the various disclosed embodiments.

The "front" face of the coil head is generally designated by the reference numeral 30, and includes a front face or surface for the outer wall 22, at the reference numeral 26, and a front face or surface for the inner wall 24, at the reference numeral 28. On FIG. 1, the ends of the heat pipes 32 are visible for illustrative purposes, but this arrangement would not be necessary, nor necessarily desirable, in an actual unit. While it typically would be desirable for the heat pipes 32 to run up to the front faces 26 and 28, the ends of the heat pipes would not necessarily be visible, assuming the front faces would exhibit a certain thickness that covers the ends of the heat pipes.

In general, the inner wall 24 and the outer wall 22 are substantially rigid in structure, and do not have movable portions that can be "opened" to place a workpiece within a circumferential area, and then "closed" to essentially constrain the workpiece within that circumferential area. Such movable coil structures are used in some of the conventional induction heating tools. On the other hand, if desired it certainly would be possible to build the coil head 20 in a manner such that a portion of the induction coil 34 could pivot or otherwise physically move with respect to other portions of the coil head 20 and still accomplish the main function of the present invention. (This statement is also true for the other embodiments described herein.) However, since the U-shaped induction coil 34 is shaped to partially surround a workpiece, such a movable portion of the coil head 20 is not really necessary in the present invention, and the rigid walls 22 and 24 can be made so that they are essentially non-movable with respect to one another.

The mid-portion 40 of the tool 10 includes an outer case 42, and a trigger-type actuator button at 44. The operator grasps the unit with his or her hand around the mid-portion case 42, and can use his or her index finger to actuate the trigger 44. An alternative to the hand-actuated trigger 44 is to provide a foot switch, for example, that is wired into the tool 10. All versions of the portable tool described herein could be made to operate in this manner, i.e., using a foot switch instead of the hand-actuated trigger 44.

A further alternative to the trigger 44 is to provide an automatic "start" switch that is controlled by an external process control system. In this configuration, the tool 10 could be mounted on a robotic arm, for example, as part of an automated manufacturing assembly line to solder or braze pipe sections together, which could be incorporated into a larger device (such as an automobile). When the robotic arm has been placed in a predetermined position., the assembly line's process control system could activate a relay (e.g., a solid-state switch) within the tool 10, and a heating event (or heating cycle) could then be initiated. All versions of the portable tool described herein could be made to operate in this manner.

A yet further alternative is to provide a proximity sensor 38 that could be mounted on the tool 10 at various locations- see FIG. 1 for examples. The tool 10 could be placed into a mode in which the heating event is automatically initiated once the proximity sensor determines that a "target" material (e.g., two sections of metal pipe to be joined) has come within a predetermined distance from the coil head 20. This type of operating mode may be more suitable to a non-human user environment, such as one in which the tool 10 is attached to a robotic arm, for example. All versions of the portable tool described herein could be made to operate in this manner.

The largest portion in physical size of the tool 10 is the heat exchanger portion 50, as seen in FIG. 1. The heat exchanger is covered by a portion of the outer casing at 52, which includes a number of venting slots 54. Within the heat exchanger is a large heat sink 56, and also a small fan (not shown on FIG. 1).

In addition, there is a receiving area 70 in heat exchanger portion 50 for receiving power, which could he an electrical receptacle that is used for plugging into an electrical cable (not shown on FIG. 1), or for wiring an electrical cable directly into the portable unit (i.e., tool 10) through an opening on the housing 52. Alternatively, receiving area 70 could perhaps comprise an antenna, for receiving power in the form of electromagnetic energy, such as radio waves or microwaves.

Figure 2:
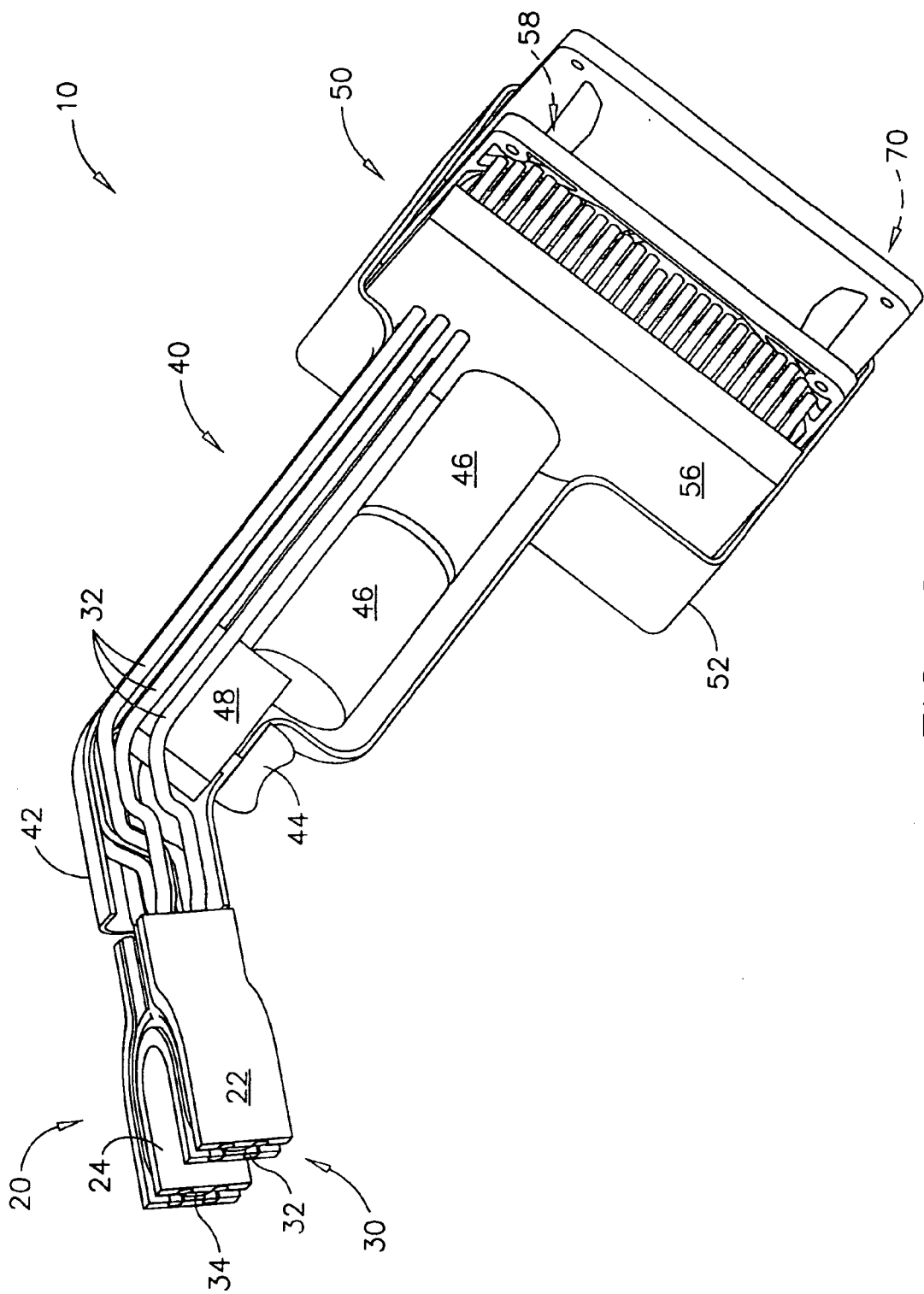
FIG. 2 is a perspective view in partial cross-section from the opposite side of the tool of FIG. 1.

Referring now to FIG. 2, the inner components of the mid-portion 40 and the heat exchanger portion 50 are visible. The trigger button 44 actuates an electrical switch 48, and this arrangement can be seen on FIG. 2. The heat exchanger fan 58 is also visible in FIG. 2, and is mounted in close proximity to the large heat sink 56, which exhibits a large number of protruding pins, which alternatively (or in combination with) could be a large number of fins or vanes.

Also within the mid-portion 40 is a set of power capacitors 46. These capacitors 46 exchange electrical energy with the work coil 34, thereby allowing the electrical current flowing through a power cable (not shown on FIG. 2), to be minimized by having reactive electrical current shared between the capacitors and the work coil. As can be seen in FIG. 2, the heat pipes 32 run from the front face area 30 of the coil head 20 all the way back to the heat sink 56 within the heat exchanger portion 50 of tool 10.

There are several variations of this heating tool design, and many of them are illustrated in this patent document. For example, not all inductive tool units require heat pipes even though the heat pipes are useful for transferring energy away from the work coil area to the heat exchanger, and are thus more necessary for higher-powered units that can deliver more inductive power to a pipe to be soldered or brazed.

Similarly, the work coil itself may include a high number of small windings that comprise Litz wire, and the number of windings within the work coil head 20 would depend on the power output and shape of the magnetic field to be generated. One suitable type of Litz wire is manufactured by New England Wire Company, their "type 2 Litz," which has 2625 strands that are each #42 AWG insulated wires. As is known in the art, Litz wire is capable of delivering fairly high frequency electrical alternating current while minimizing the "skin effect" that would typically be found in electrical conductors of larger diameters.

An alternative type of electrical conductor for use in the induction coil 34 is copper tubing, or the coil may comprise heat pipes that use a copper outer layer. These alternative coil materials may be arranged in a physical pattern as illustrated in FIGS. 1 and 2, or in other shapes, as desired for creating an induction coil. This includes such coil patterns as illustrated in other embodiments described herein. It will be understood that other electrically conductive materials could be used in the induction coil, rather than copper; of course, copper exhibits both good electrical and thermal conductive characteristics at a relatively low cost. However, the inventors contemplate the use of alternative coil materials, even though this patent document generally refers to "copper" tubing or heat pipes having a "copper" outer skin.

The heat pipes 32 transfer energy from the work coil head 20 to the heat exchanger 50, as noted above. One suitable heat pipe is manufactured by Thermacore, such as a copper/water heat pipe of four millimeter outer diameter, and twelve inches in length. Such heat pipes are each capable of removing about sixty (60) watts of thermal energy at an operating temperature of 100° C. These heat pipes 32 are essentially hermetically sealed; the liquid inside the heat pipe vaporizes at the "hot" end at the coil head 20, and the heat is transferred down to the "cool" end at the heat sink 56, where the vaporized liquid now condenses and flows as a liquid via capillary action through wick material within the heat pipe, back toward the hot end at the coil head 20. Of course, other heat pipe models made by Thermacore, or other heat pipes made by different manufacturers, could be used in the present invention.

One negative effect of using heat pipes made of copper is that they will be somewhat heated by the magnetic energy that is produced by the work coil 34, if the heat pipes are positioned in close proximity to the work coil conductors. Therefore, it is better if the heat pipes are located in regions of the coil head 20 where they receive a minimal amount of the magnetic energy produced by the work coil 34. Some details of suitable locations are provided in later views, such as in FIGS. 5 and 6.

The materials used in the coil head generally should be selected to handle high temperature, and should be at least somewhat resistant to abrasion and chemicals. Certain types of ceramic materials are suitable for many heating applications. One suitable material is MACOR™, or some other type of high temperature insulating material, such as a different type of ceramic material. This is particularly appropriate for the inner wall of the coil head especially for the innermost surface of the inner wall 24. For other portions of the coil head 20, a more thermally-conductive material may be suitable, including for the outer wall 22. A suitable material is aluminum nitride.

In some of the embodiments disclosed herein, there are no heat pipes running through the mounting wall, and in those situations the materials used in the outer walls of the work coil preferably are heat conductive. In that situation, a suitable material is aluminum nitride. The inner wall's inner surfaces typically should always be of a thermally insulative material (e.g., MACOR), and one with a sufficiently high temperature rating to withstand direct contact with a heated workpiece (at least for momentary contact—i.e., for the heating event interval).

In general, the heat sink size and power rating are selected based upon the overall power ratings for the heating tool 10, itself. For example, a tool that is to remove 200 watts of power would have a 200 watt-capable heat sink. An aluminum heat sink would be of a suitable material, and a "pin-fin" style is a suitable type of heat sink. Many suppliers manufacture this type of heat sink, and they are available as stock items from many distributors and manufacturers.

The fan in the heat exchanger 50 is also selected for the power level of the tool. For example, a 200 watt tool could use a fan that is 80×80×25 millimeters in size, and rated at 10 watts of electrical power consumption. This would be a common fan used in many consumer electronics. Other tool power ratings could use fans of other sizes. It should be noted that the first embodiment illustrated in FIGS. 1 and 2 is designed to continuously remove 300 watts of power (in the form of heat energy) from the work coil head 20 area. A 200 watt tool also is disclosed herein, starting in reference to FIG. 3. These above numeric wattage values are in reference to the tool's thermal energy dissipation capacity, not the power output rating of the induction coil, which is referred to herein as the quantity of power that is "delivered" to the workpiece. A third power characteristic of the induction heating tools described herein is the amount of power losses within the induction coil; these are resistive losses that generate thermal energy according to the equation $P=I^2R$, where I is current in amperes, R is resistance (of the coil) in ohms, and P is power in watts.

Other induction heating tools having a lower thermal transfer rating are also disclosed herein, including 100 watt tools and 90 watt tools. Such power ratings noted herein are in reference to the amount of thermal energy that can be continuously removed from the coil head by the tool's thermal management system. A tool having a heat exchanger and a fan will generally be able to remove more thermal energy than a tool that does not have these features. A tool having heat pipes running into the coil head will generally be able to remove more thermal energy than a tool that does not have that feature.

It should be noted, however, that the induction heating tool 10 can actually deliver a much greater quantity of power to a workpiece than the tool's thermal management system can continuously dissipate. For example, the heating coil 34 is able to deliver a much higher amount of power, such as 600 watts, to a workpiece. In a preferred mode of the present invention, the heating of a workpiece is accomplished by placing the workpiece as closely (or tightly) as possible to the U-shaped inner wall and coil region. The tool 10 is then activated and the workpiece is heated by induction. When the workpiece reaches the desired temperature (usually indicated by melting of the braze or solder), then the tool 10 is shut off. This cycle is then repeated for each joint.

However, the work coil 34 is also "heated" during each heating cycle, not by induction, but due to resistive losses within the induction coil 34 itself. For example, if the coil delivers about 600 watts of power to the workpiece, if its resistive losses are 400 watts during the heating event, and if its thermal management system can continuously transfer 300 watts away from the coil head 20, then its maximum duty cycle is about 75%, and its efficiency is about 60%. These characteristics are defined as follows:

Coil Efficiency={Power delivered to the workpiece, divided by coil losses+power delivered to the workpiece}

Maximum duty cycle={Thermal transfer rating, divided by coil losses}

In the above example, the coil efficiency is: {600 w/(400 w+600 w)}=60%.

In the above example, the maximum duty cycle is: {300 w/400 w}=75%.

The above 60% coil efficiency has been achieved in a working prototype of the present invention, and with refinements, an even greater efficiency should be possible. A coil efficiency of 50% should be achievable even if the design "rules" that are described below are not precisely followed; in other words, variations in the coil shape, size, and construction will lead to different results, but are still an improvement over conventional induction heating designs, and still fall within the principles of the present invention.

If the coil losses are less than or equal to the tool's continuous thermal transfer rating, then the induction coil 34 may be continuously energized, so long as there are no other constraints in the system. The induction coil 34 may be cooled to increase the continuous thermal transfer rating. However, a continuous use of such a portable induction heating tool is not usually necessary, nor may it even be desirable, since such a heating tool would likely be bulkier, and thus somewhat less "portable."

Therefore, for many important uses, the coil of the induction heating tool of the present invention will typically operate at a greater power rating, such that its coil losses are greater than the continuous thermal transfer rating. It that situation, the heating tool 10 should observe a cooling off period between activations (e.g., "heating events"). Of course, the induction coil 34 may be cooled to permit repetitive joining operations to occur more quickly. In the above example, the duty cycle was calculated at 75%, which represents the ratio of operating time to heating event time. At this 75% duty cycle, the heating events could be repeated after a cooling (or "cool off") interval of about one-third the heating time. The cool down period between heating events allows the coil head 20 to reach an acceptable temperature before its coil 34 is energized again. A temperature sensor could be incorporated in the coil head (or near the coil head) to ensure that the tool is not used again until the acceptable temperature has been achieved.

Another feature of the present invention is that the work coils may be interchangeable for use with different workpiece (pipe) sizes that are to be soldered or brazed, as well as can be interchangeable for use in different duty cycles. For example, a "standard" 600 watt work coil 34 could be connected to a 100 watt rated induction tool, if desired. The 100 watt tool would have not be able to remove thermal energy as quickly as a 300 watt tool, for example, and it would likely need to remain off for a time interval before its next use. If interchangeable coil heads are desired, however, special care should be taken for making electrical connections for the Litz wiring (or copper tubing), and also for the heat pipes that may (or may not) run into the coil head area. If a particular coil includes one or more heat pipes, then the heat pipes running through the grip portion 40 can be positioned so as to contact the heat pipes in the coil head 20, at their butt ends. A thermally conductive grease could be applied thereto when interchanging such coil heads, which would assist in lowering the thermal resistance to this type of heat transfer circuit.

The interior separation dimension between the walls 24 of the U-shaped inner wall of the work coil 20 can be varied, and such different spacings could be used for coil heads that have the same power ratings, or they could be for coils of different power ratings. Again, the interchangeability of the tool and coil heads is a feature of the present invention, and would require commonality of electrical connections and of heat pipe connections between the work coil 20 and its mounting wall 60, as a set of minimum criteria.

It will be understood that the heat pipes 32 are not generally designed to carry electrical current, at least not the "load current" that drives the induction coil 34. There may be some electrical current induced in the metal (e.g., copper) walls of the heat pipes 32 because a portion of the heat pipes run into the coil head area 20, and are thus exposed to the magnetic field produced by the induction coil 34. However, these electrical currents merely are by-products of the magnetic field—they are AC eddy currents that are induced by the magnetic field. This embodiment of the present invention should not be confused with some of the prior art induction heating devices that use metal tubes to carry the load current, and in which these metal tubes are force-cooled by water or some other cooling fluid (e.g., by air, or other gasses or liquids) running through the interior regions of the hollow tubes. In these prior art devices, the metal tubes are also the induction coil itself. The heat pipes of this embodiment of the present invention are not the induction coil; as will be seen in some of the later-described embodiments herein, the heat pipes do not even run into the coil head area (in certain embodiments), and moreover, in some embodiments there are no heat pipes at all—but there is always an induction coil.

Figure 21:
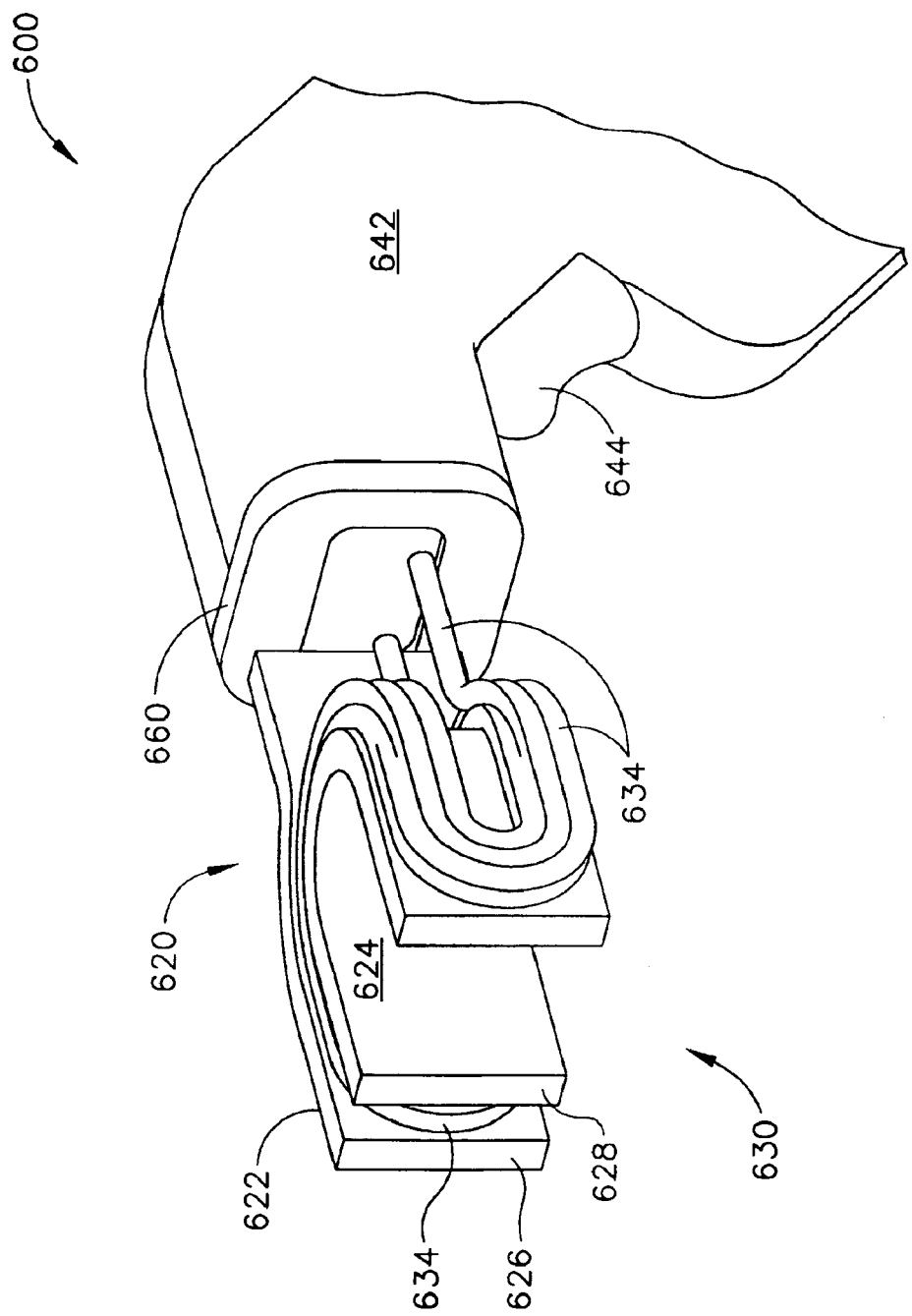
FIG. 21 is a perspective view from the front and right side of an alternative coil head design, usable in the heating tool of the present invention, in which the induction coil itself comprises a heat pipe having an electrically conductive outer casing (with an insulative coating).

Note, however, that alternative embodiments of the present invention are described herein which use heat pipes that do carry the induction coil load current. In that configuration, the heat pipes themselves exhibit an electrically conductive outer layer of material (e.g., copper) that is insulated from the other structural elements of the heating tool, and this outer layer of electrically conductive material comprises the induction coil itself. Such an alternative embodiment is illustrated in FIG. 21, which is described below.

When joining two pipe sections using the tool 10, a flexible "tape" or "ribbon" of soldering compound can be placed around each of the pipe sections (not shown), and a cylindrical coupler member typically is moved into place around the two unjoined pipe sections. In one mode of the present invention, a piece of the solder tape (or ribbon) is introduced between the coupler member and one of the pipe sections; or a piece of the solder tape (or ribbon) is introduced between the coupler member and each of the two pipes sections. In this mode, the solder ribbon or tape is pre-positioned between the coupler and at least one of the pipes.

The entire coupler assembly can then be heated by the magnetic field generated by induction coil 34, thereby raising the temperature of both solder tapes (ribbons) to their melting point, and bond the coupler to both of the pipe sections. The induction coil must be "wide" enough to emit a magnetic field along the entire surface of the coupler; or the tool 10 can be "brushed" back and forth along the length of the coupler, so as to alternately heat up both ends of the coupler to thereby raise the temperature of the solder pieces on both ends. As an alternative, the tool 10 could be used to heat up only one end of the coupler at a time; in that scenario, the two solder tapes (ribbons) would each be heated to form a bond, only one at a time.

Alternatively, the solder can be introduced in the form of a "wire" of solder that is provided on a spool (as a "roll"), in which the solder wire is brought into the workpiece area to touch the pipe sections to be joined to the coupler while they are being exposed to the magnetic field (and thus heated), such that the solder will flow around the circumference of the cylindrical pipes by a wicking action. In this alternative mode, the solder would not be pre-positioned before the heating event commenced. In general, the soldering applications will require flux to be introduced, either separately or as part of the solder compound itself The flux can be applied separately by the user.

If the pipe sections are to be brazed together (rather than soldered), again a flexible "tape" or "ribbon" of brazing compound can be introduced (e.g., pre-positioned) around the pipe sections (not shown), and then the entire assembly (typically with a coupler) is heated by the magnetic field generated by induction coil 34. Alternatively, a wire of brazing compound can be introduced to the workpiece while it is being exposed to the magnetic field. For brazing operations, there would be no need for any separate flux compound. In addition, the brazing compound generally must be raised to a greater temperature than typical soldering compounds.

Figure 3:
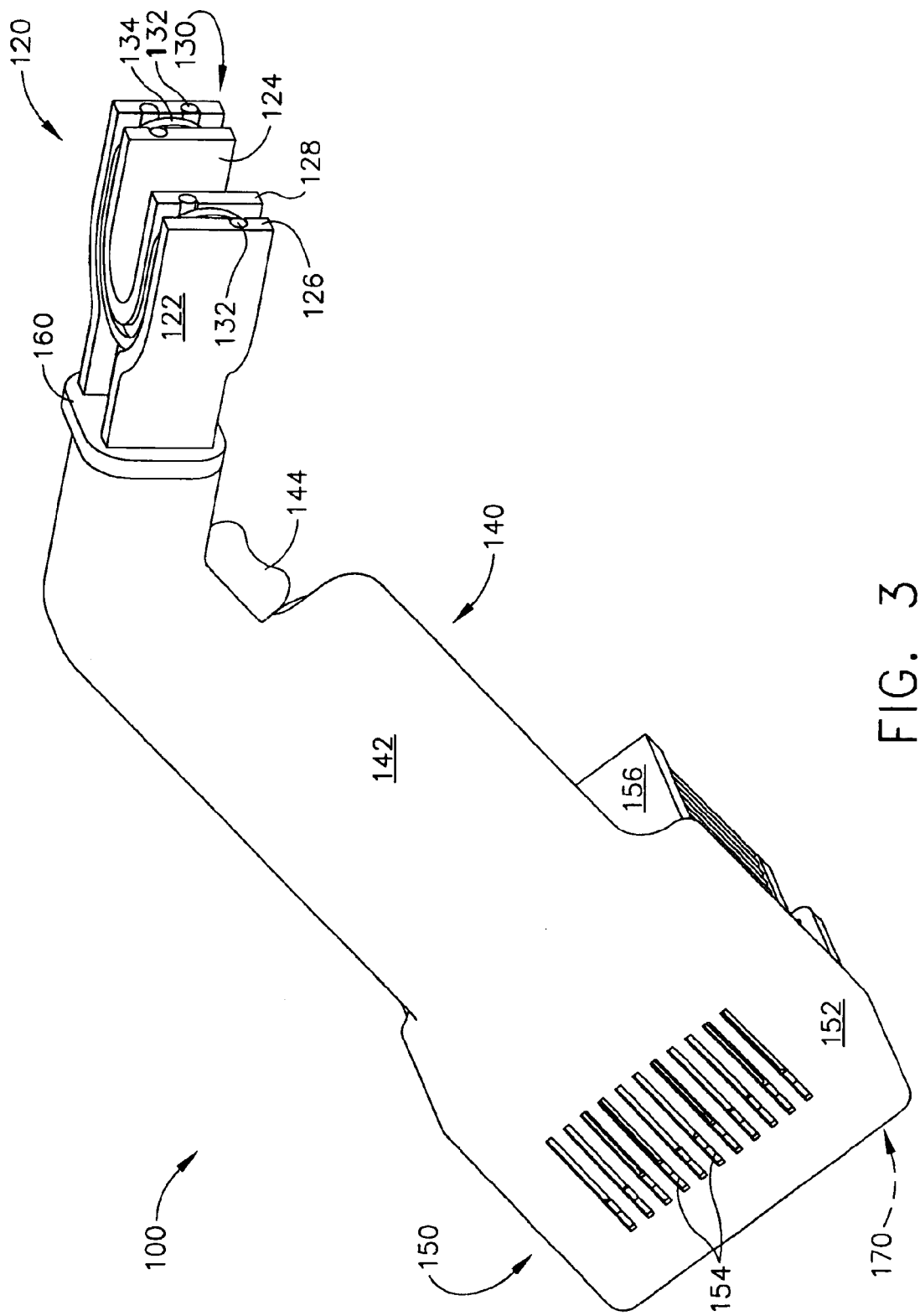
FIG. 3 is a perspective view in partial cross-section of a portable induction heating tool, constructed according to the principles of the present invention, depicting a second embodiment of a relatively lower-powered tool that includes heat pipes and a heat exchanger.

Referring now to FIG. 3, a 200 watt induction heating tool 100 is illustrated, having a coil head 120, a mid-portion 140, and a heat exchanger portion 150. Work coil 120 includes an induction coil 134, several heat pipes 132, an outer wall 122, and an inner wall 124. Work coil 120 also has a "front face" area 130, in which the front surfaces of the coil head walls are at 126 for the outer walls 122 and at 128 for the inner wall 124.

The coil head 120 mounts to a support wall structure 160, and is thereby connected to the mid-portion 140. Mid-portion 140 has an outer casing 142, and also includes a trigger button 144.

The heat exchanger portion 150 also exhibits an outer casing at 152, which includes multiple cooling slots or vents 154. The heat exchanger includes a heat sink 156, and a fan (not shown on FIG. 3). There is also a receiving area 170 in heat exchanger portion 150 for receiving power, which could be an electrical receptacle that is used for plugging into an electrical cable (not shown on FIG. 3), or perhaps another structure for receiving or transferring power.

Figure 4:
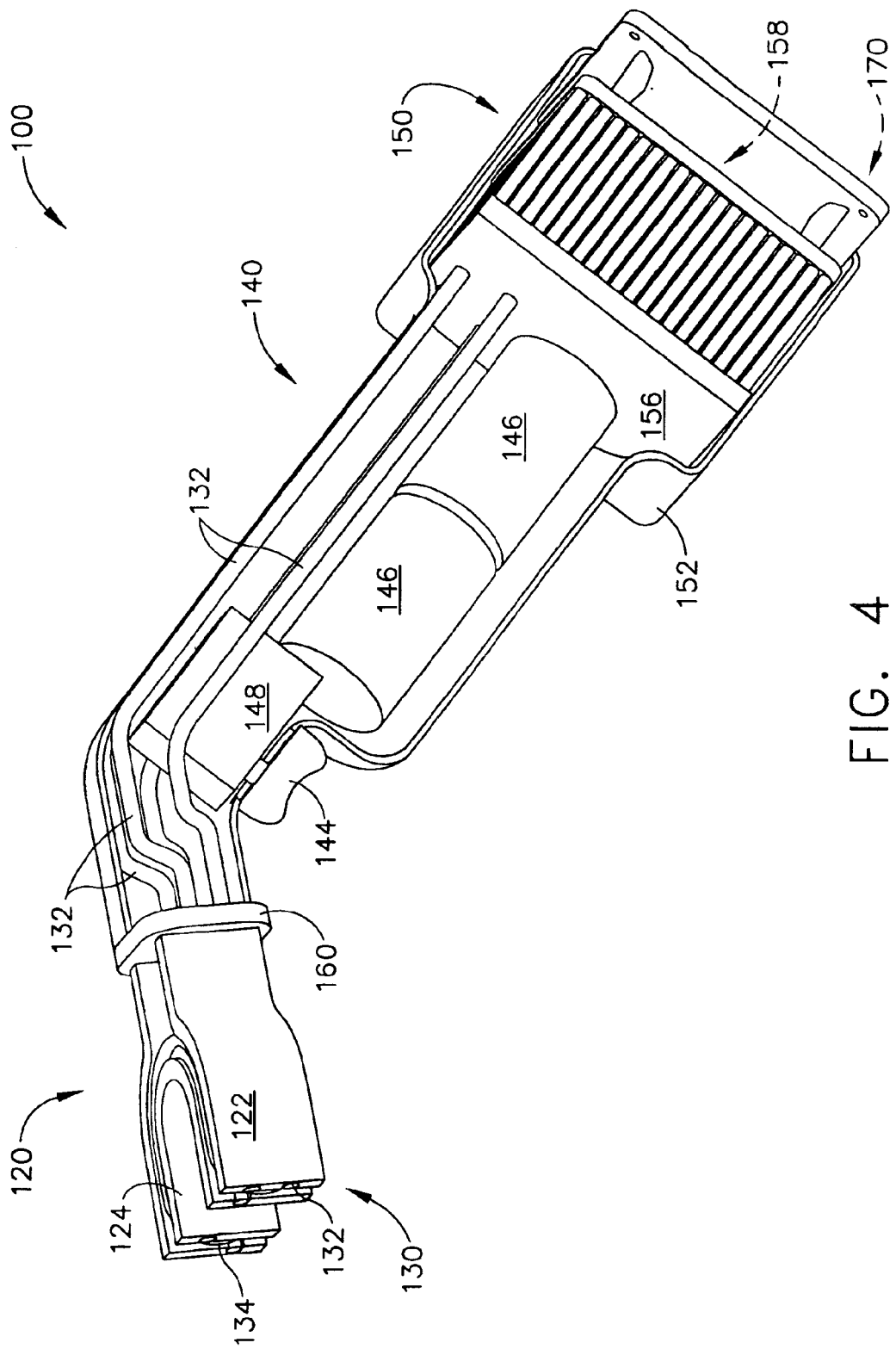
FIG. 4 is a perspective view in partial cross-section from the opposite side of the tool of FIG. 3.

Referring now to FIG. 4, the fan 158 can now be seen, as being mated to the heat sink 156, which has multiple fins for increased cooling effect. The mid-portion 140 also includes an electrical switch 148 that is actuated by the trigger 144; it also includes a set of power capacitors 146 that exchange reactive current with the induction work coil 134. Some of the heat pipes 132 can also be seen as traveling through the mid-portion 140.

The main difference between the second embodiment of FIGS. 3 and 4 and the first embodiment of FIGS. 1 and 2 is that the second embodiment (e.g., a 200 watt heat transferrated unit) has fewer heat pipes 132, and has a smaller heat sink and fan, as compared to the larger (e.g., 300 watt) unit of FIGS. 1 and 2. The work coil 120 could have the same physical size as the work coil 20, if desired, or it could be smaller in physical size, to reflect the fact that it would typically run at a lower power rating. Since there are fewer heat pipes 132, the rate of heat transfer would theoretically be smaller for the second embodiment of FIGS. 3–4 (unless different heat pipes of a greater thermal transfer rating were used).

Figure 5:
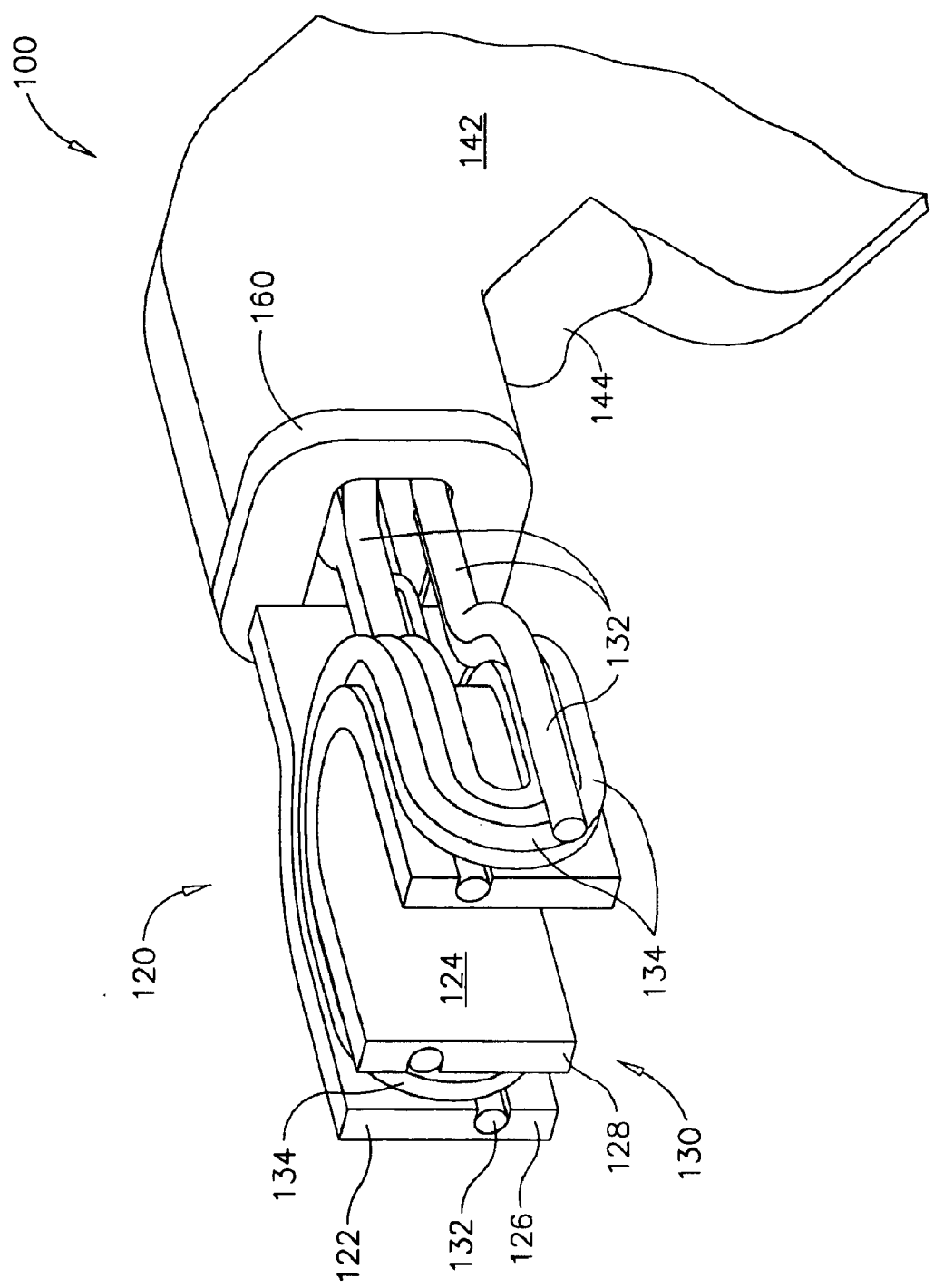
FIG. 5 is a perspective view of the coil head of the tool of FIG. 3, from the right and front of the coil head, with one of the outer walls missing to show details of the coil head.

Referring now to FIG. 5, the general configuration of the Litz wire conductors (or copper tubing) that make up the work coil 134 is better illustrated, since the "near" outer side wall 122 has been removed for illustrative purposes. Moreover, one of the heat pipes 132 can also be seen without the near outer wall in the view, and this heat pipe 132 extends through the support wall 160 and out toward the face 126 that would appear on FIG. 5 if the near outer wall 122 was visible. It should be noted that, in the embodiment of FIG. 5, the induction coil 134 would generally not comprise one or more heat pipes, since a separate heat pipe 132 is provided.

Figure 6:
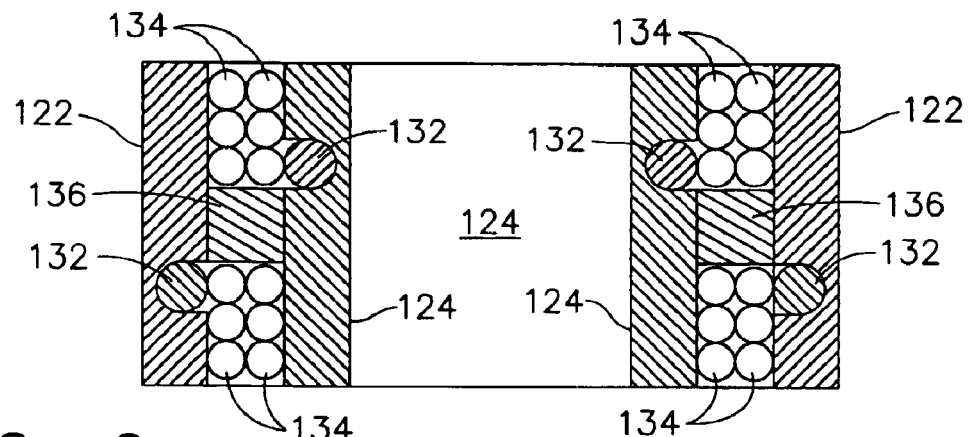
FIG. 6 is a section view from the front of the coil head of the tool of FIG. 3.

FIG. 6 illustrates some further details of the coil head design for the head 120, and shows the orientation between the electrical coils 134 that are made of Litz wire (or copper tubing), and also the physical positioning of the heat pipes 132 with respect to the coil conductors 134 and also the inner and outer coil head walls 122 and 124, respectively. As discussed above, if the heat pipes 132 are made of a metallic material, such as copper, then they will receive and be somewhat heated by the magnetic field produced by the work coil 134 when it is energized. The physical orientations illustrated in FIG. 6 provide an example of the orientation of the heat pipes 132 that will tend to minimize the effect of this heating due to the eddy currents that will be generated in the copper heat pipes. The positioning of the heat pipes with respect to the induction coil windings is a fairly important factor that should not be overlooked in a coil head design.

FIG. 6 also makes visible a set of electrically insulative members 136 that can be inserted between the upper and lower runs of the coil conductors 134, and between the inner and outer walls 124 and 122, respectively. While this area could be left empty, it is typically better to include such inserts 136 if they are also made of a thermally conductive material. One suitable material is aluminum nitride. These inserts can be used in all coil head embodiments of the present invention.

Figure 7:
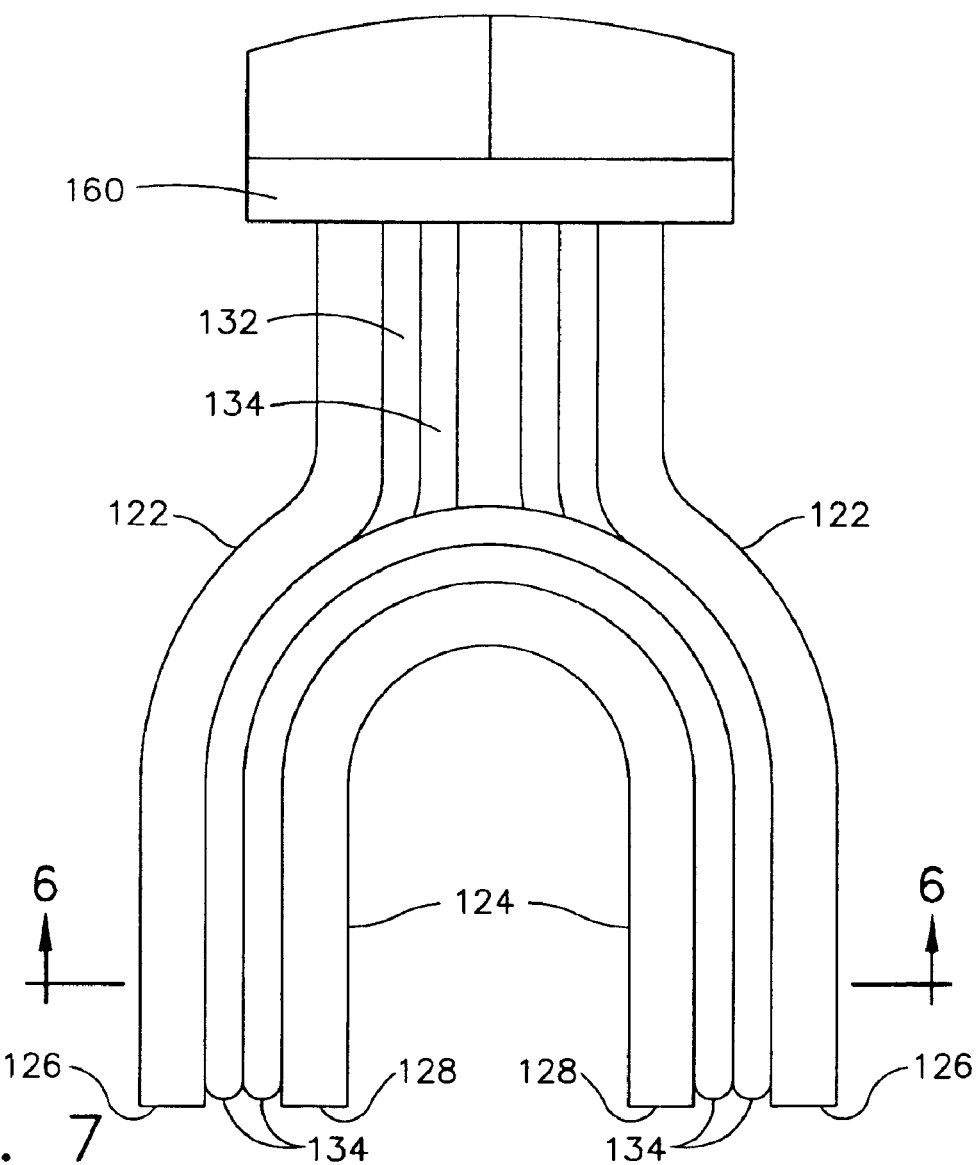
FIG. 7 is a top view of the coil head of the tool of FIG. 3.
Figure 8:
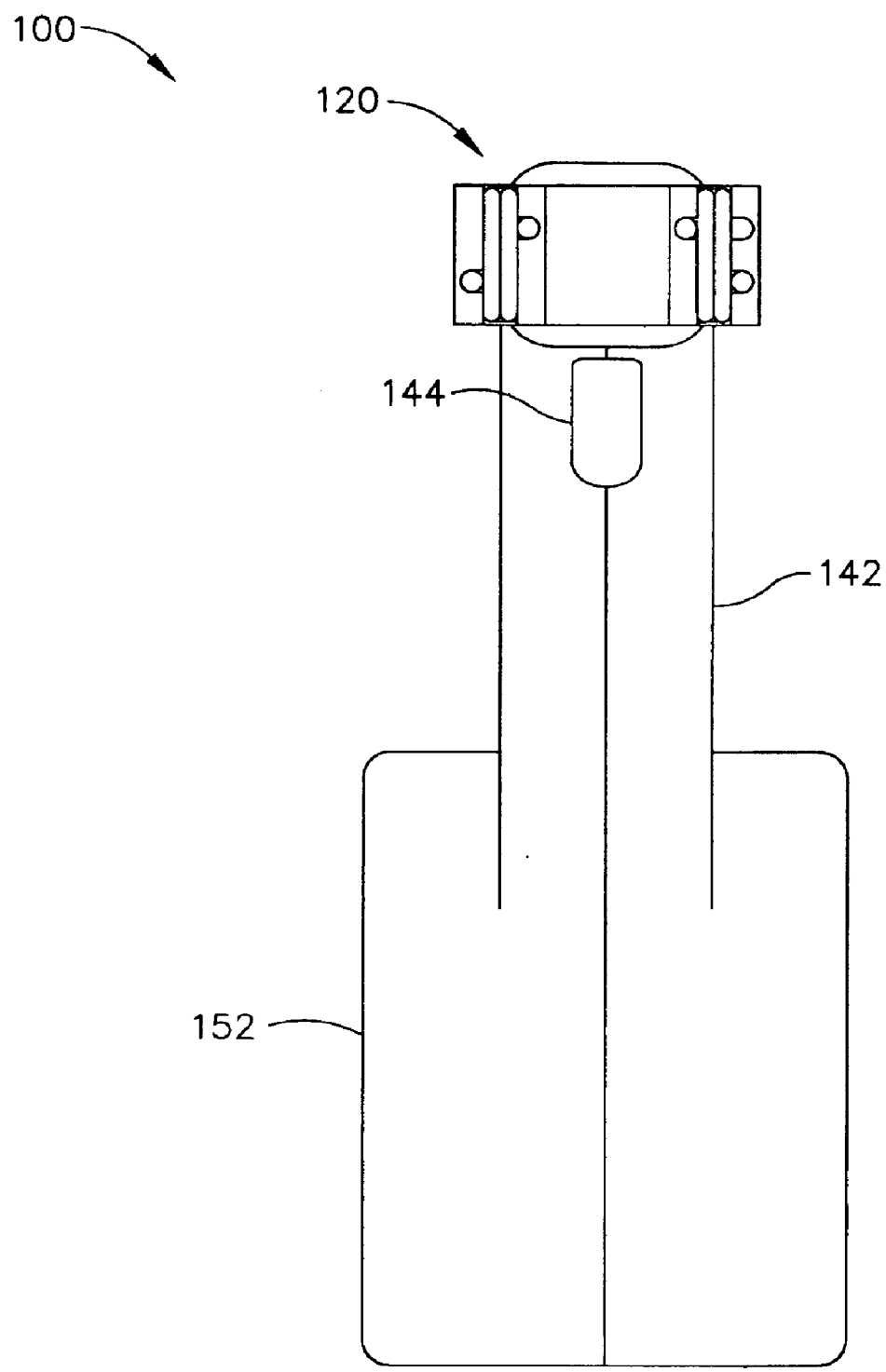
FIG. 8 is a front elevational view of the entire tool of FIG. 3.
Figure 9:
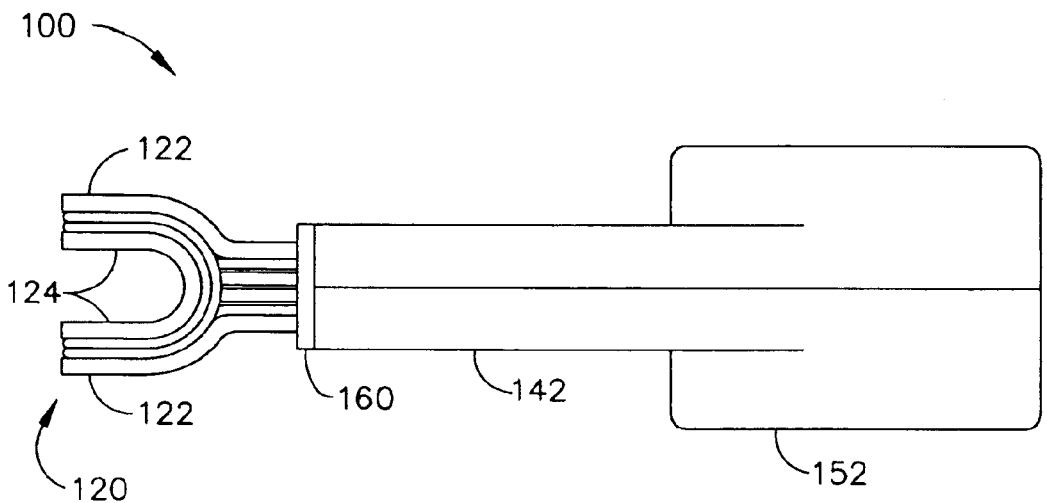
FIG. 9 is a top plan view of the entire tool of FIG. 3.

Referring now to FIG. 7, the work coil head 120 is illustrated from an angle that clearly shows the U-shape of the inner wall 124 of the head. The physical orientation of the work coil windings 134 is illustrated between the inner wall 124 and the outer wall 122. Also clearly visible in FIG. 7 are the "front face" surfaces 126 and 128 of the inner and outer walls 124 and 122, respectively.

Referring now to FIGS. 8–11, the "200 watt" embodiment of FIGS. 3 and 4 (i.e., designated by the reference numeral 100) is illustrated in side, front, top, and bottom views. In this exemplary design, the overall length is approximately twelve inches, the overall height is approximately nine inches, and the maximum width is about three and one-half inches. The outer width of the coil head 120 is just over two inches in this exemplary embodiment. It should be noted that these dimensions are based on prototype units, and production units have not yet been implemented as of the writing of this patent document.

Figure 10:
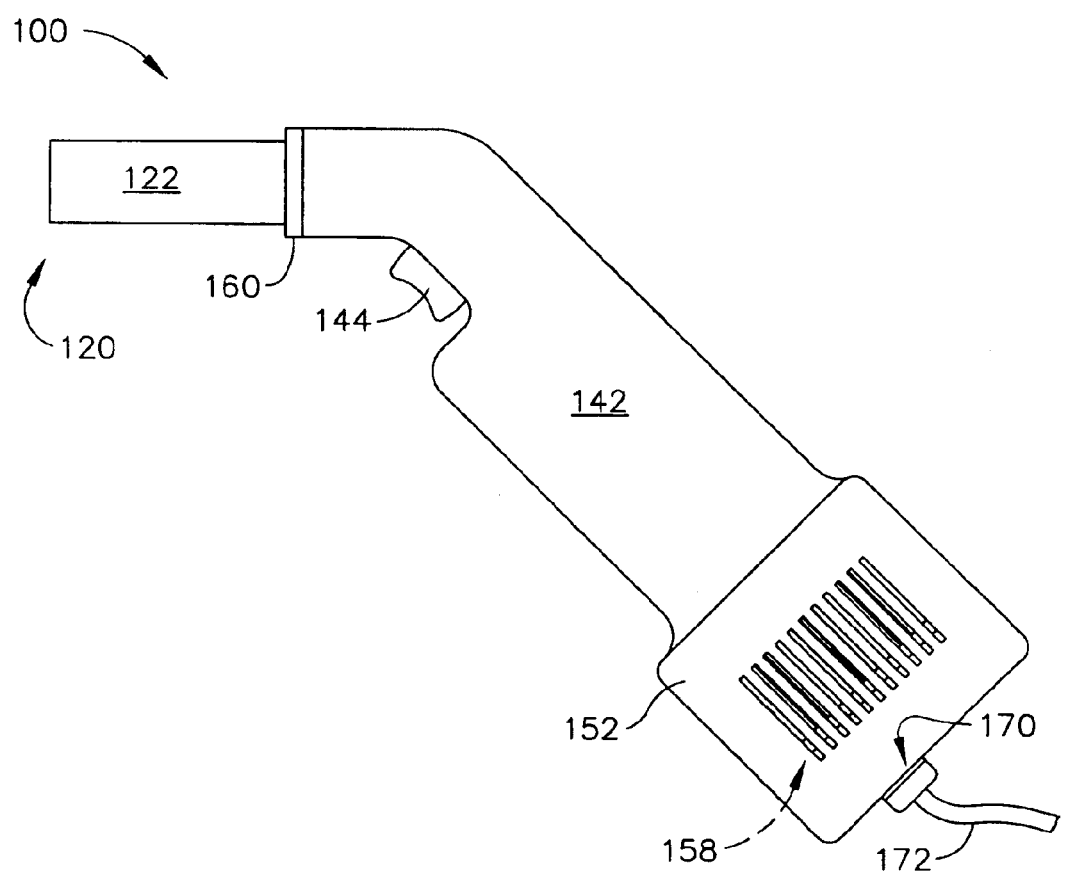
FIG. 10 is a right-side elevational view of the entire tool of FIG. 3.
Figure 11:
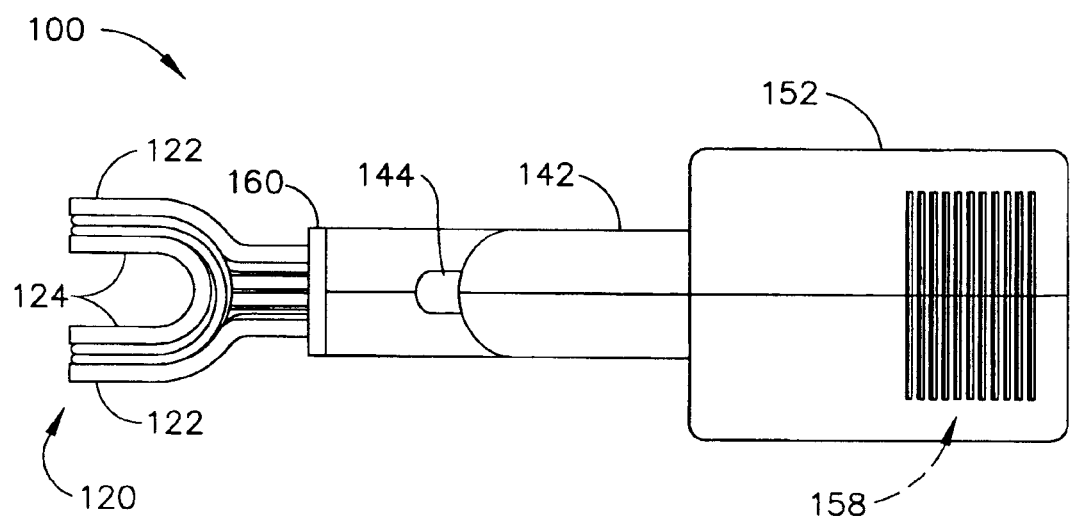
FIG. 11 is a bottom plan view of the entire tool of FIG. 3.

A power cable 172 can be plugged into a receptacle at receiving area 170, as seen in FIG. 10. The receptacle, of course, could be positioned at a different location than indicated (at 170) on the tool 100. The power cable 172, alternatively, could be "hard-wired" into the tool 100 at the receiving area 170 (or at a different location on the tool 100).

Figure 12:
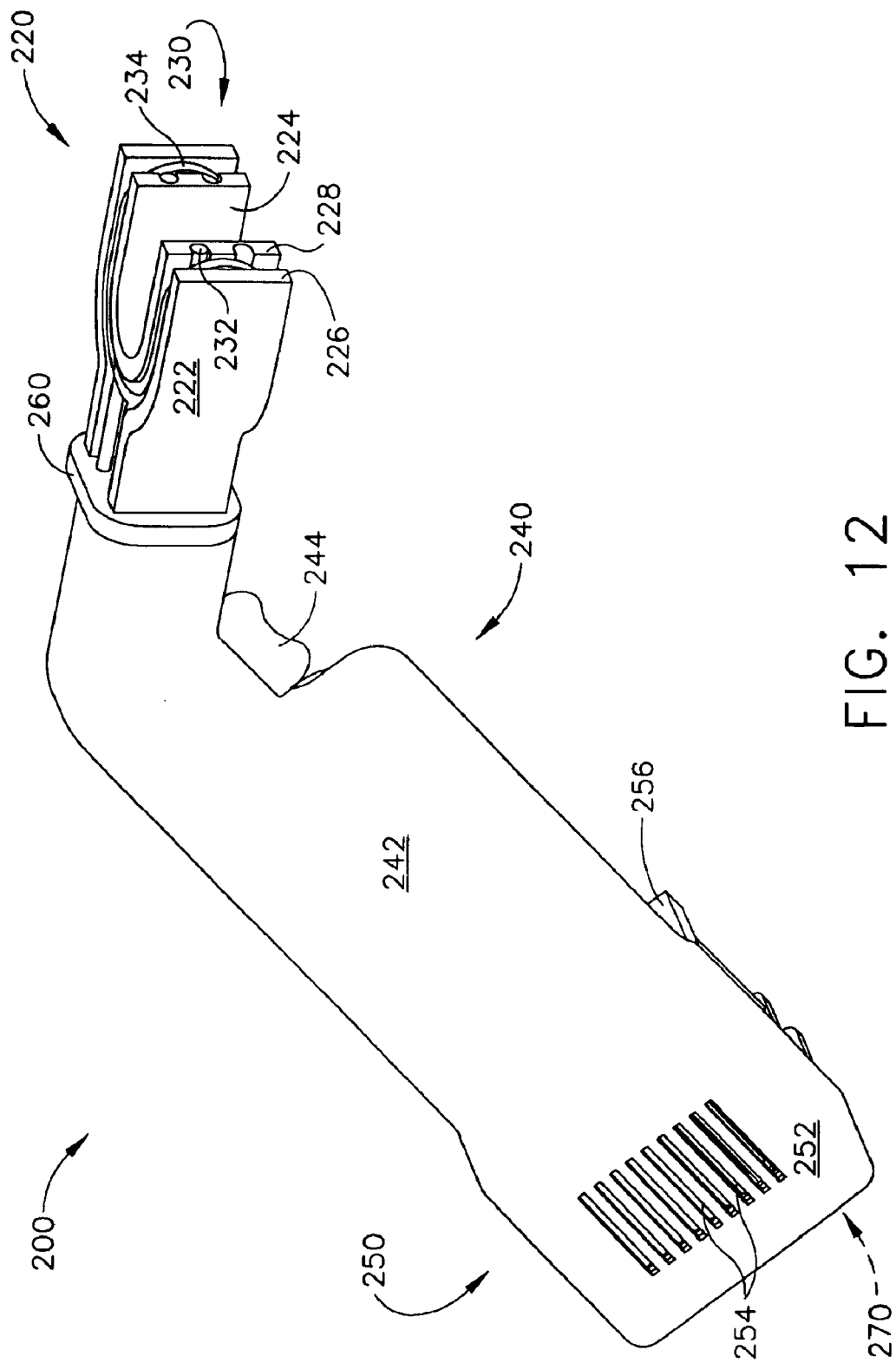
FIG. 12 is a perspective view in partial cross-section of a portable induction heating tool, constructed according to the principles of the present invention, depicting a third embodiment of a relatively lower-powered tool that includes heat pipes and a heat exchanger.

Referring now to FIG. 12, a third embodiment of an induction heating tool is illustrated, generally designated by the reference numeral 200. This heating tool 200 includes many of the same components that were seen in the other embodiments described above and illustrated in FIGS. 1–11, including a work coil head 220, a mid-portion 240, a heat exchanger portion 250, and a mounting wall 260 between the mid-portion 240 and the coil head 220. In this embodiment 200, the heat exchanger 250 is somewhat smaller than in the second embodiment illustrated in FIGS. 3 and 4, and there are also fewer heat pipes (as can be seen in FIG. 13), and thus this particular tool 200 will typically have a lower continuous power rating, such as 100 watts of heat transfer capability.

In the coil head 220, there is a set of induction coils 234, a set of heat pipes 232, an outer wall on both sides at 222, and an inner wall 224 that has a general U-shape. The front face area is designated by the reference numeral 230, and there is a front face surface 226 for the outer wall 222 and a front face surface 228 for the inner wall 224.

The mid-portion 240 has an outer casing 242, and includes a trigger button 244. The heat exchanger portion 250 has an outer casing at 252 that exhibits several vents or slots 254. Heat exchanger 250 also includes a heat sink 256, and includes a receiving area 270 for receiving power, which could be an electrical receptacle that is used for plugging into an electrical cable (not shown on FIG. 12), or perhaps another type of structure for receiving or transferring power.

Figure 13:
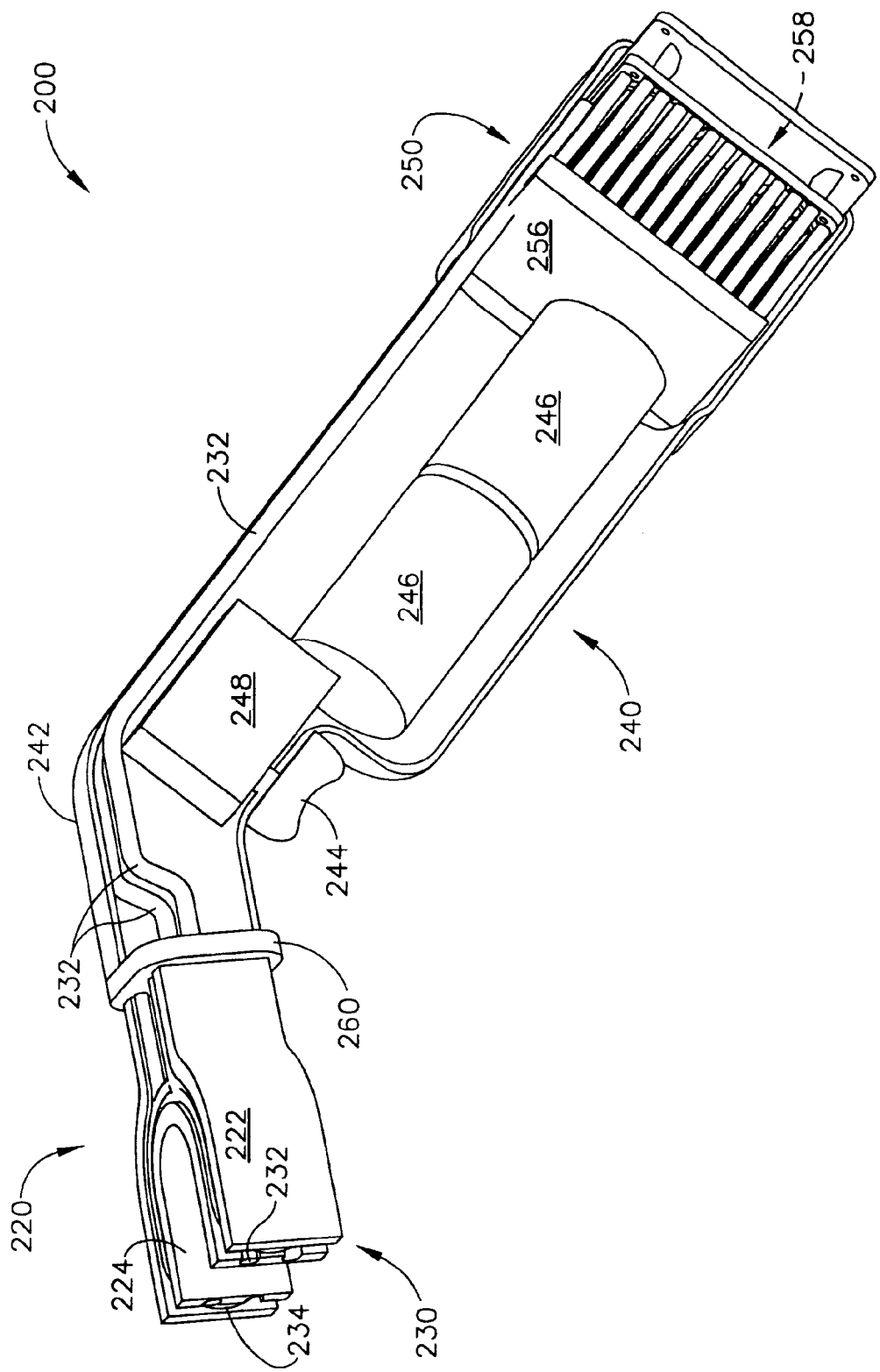
FIG. 13 is a perspective view in partial cross-section from the opposite side of the tool of FIG. 12.

FIG. 13 also shows this third embodiment 200, and the power capacitors 246 and an ON-OFF switch 248 are illustrated within the mid-portion 240. There is a single heat pipe 232 that travels along each side of the mid-portion 240, and this heat pipe 232 travels into the coil head 220 (as noted above in reference to FIG. 12). The fan 258 is illustrated as being mounted next to the heat sink 256, within the heat exchanger portion 250.

Figure 14:
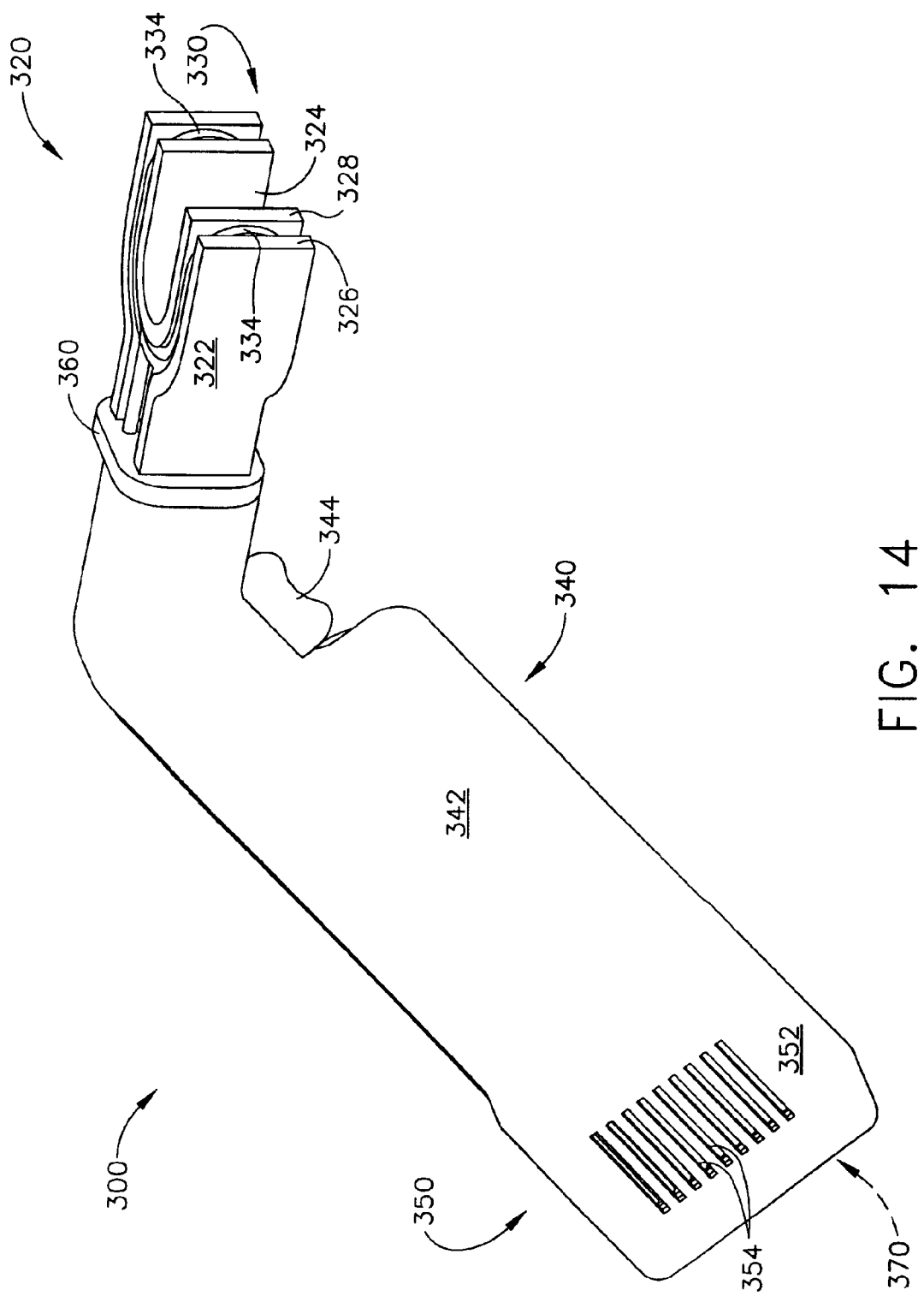
FIG. 14 is a perspective view in partial cross-section of a portable induction heating tool, constructed according to the principles of the present invention, depicting a fourth embodiment of a relatively lower-powered tool that includes heat pipes and a heat exchanger.

Referring now to FIG. 14, a fourth embodiment induction heating tool generally designated by the reference numeral 300 is illustrated. This tool 300 is approximately the same in overall size as the third embodiment heating tool 200, however, the heat pipes do not extend into the coil head region, which is a coil head 320. In this configuration, the power rating would be somewhat less than for the third embodiment design illustrated in FIGS. 12–13 if the same sized components are used for both. Moreover, the materials used for the inner and outer walls of the coil head 320, as well as for a mounting support 360 would preferably have somewhat better heat transfer qualities, and thus be at least somewhat heat conductive. As noted above, aluminum nitride could be used in the coil head walls and wall support to conduct heat away from the work coil 320.

The induction heating tool 300 includes a work coil 320, a mid-portion 340, a heat exchanger portion 350, and a mounting wall 360 between the work coil 320 and the mid-portion 340. The coil head 320 includes a work coil 334, which is surrounded by a U-shaped inner wall 324 and a set of outer walls 322. A front face area 330 includes a front face surface 326 for the outer walls 322, and a front face surface 328 for the inner wall 324.

The mid-portion 340 includes an outer casing 342 and a trigger button 344. Heat exchanger portion 350 has an outer casing 352 that exhibits several slots or vents 354. There is also a receiving area 370 in heat exchanger portion 350 for receiving power, which could be an electrical receptacle that is used for plugging into an electrical cable (not shown on FIG. 14), or perhaps another type of structure for receiving or transferring power.

Figure 15:
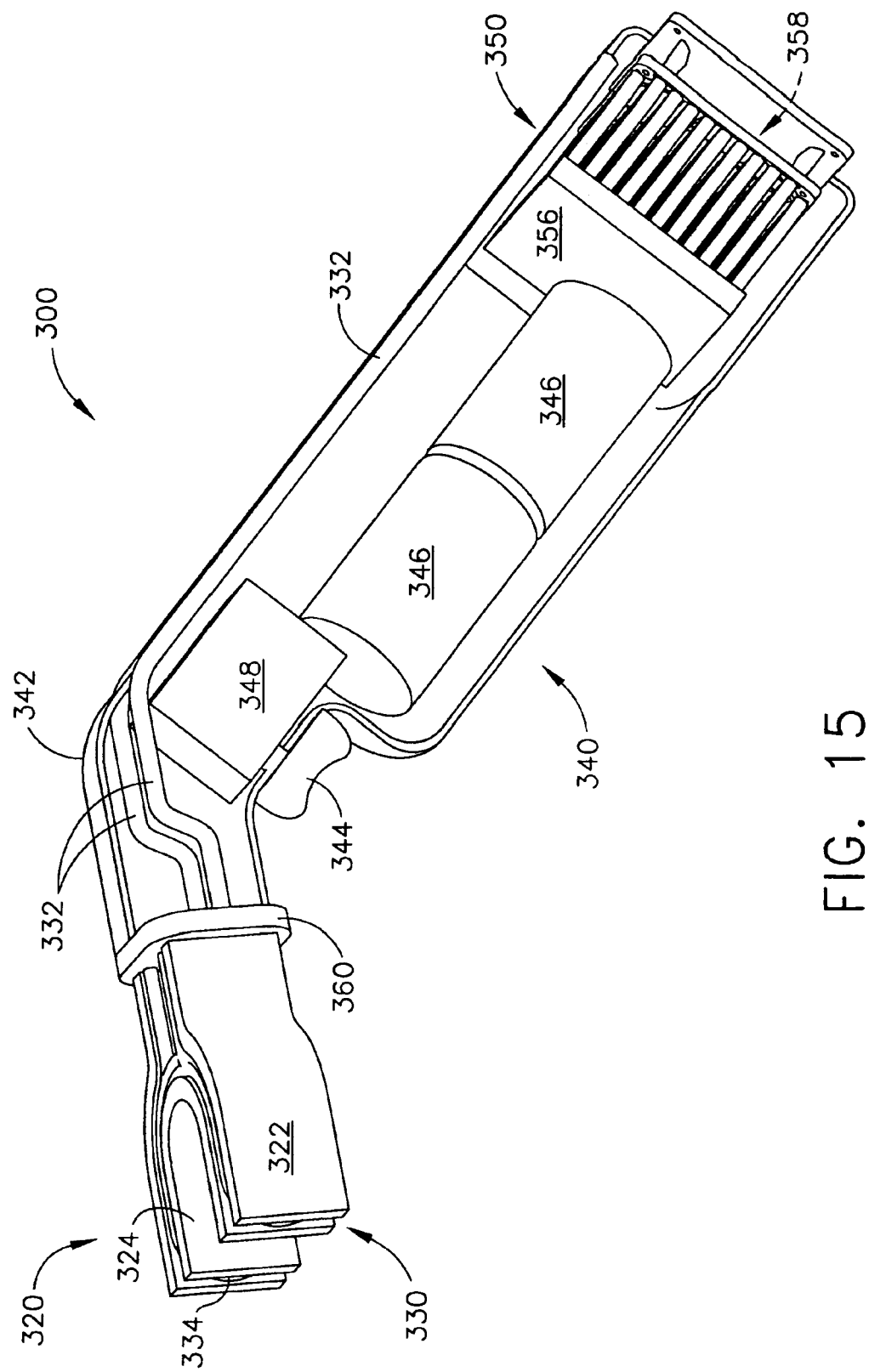
FIG. 15 is a perspective view in partial cross-section from the opposite side of the tool of FIG. 14.

On FIG. 15, the power capacitors 346 and an ON-OFF switch 348 are visible, as being included within the mid-portion 340. As can be seen in FIG. 15, there is a single heat pipe 332 on both sides as it runs down the mid-portion to the heat exchanger. As noted above, in this fourth embodiment 300, the heat pipes 332 do not extend through the support wall 360 and into the coil head 320. Therefore, it is desired for the coil head walls 322 and 324 to have some heat conductive capabilities, and also for the mounting support wall 360 to be able to transfer heat, and thus have some heat conductive characteristics. This embodiment 300 might have a power rating that is about 10% lower than a similar-sized tool that allows the heat pipes to travel through the support wall into the coil head. For example, this fourth embodiment 300 could be designed for a 90 watt continuous heat transfer rating, as opposed to the example 100 watt rating of the embodiment 200 illustrated in FIGS. 12–13.

It should be noted that the coil head 320 could be mounted so as to be swiveled if desired, particularly since no heat pipes extend into the coil head itself in this embodiment. A U-joint, or other pivotable mounting structure, could be used at the mounting wall 360, for example. A special provision would be needed for the electrical conductors that run into the coil head 320 to be at least somewhat flexible, in this swivelable alternative.

Figure 16:
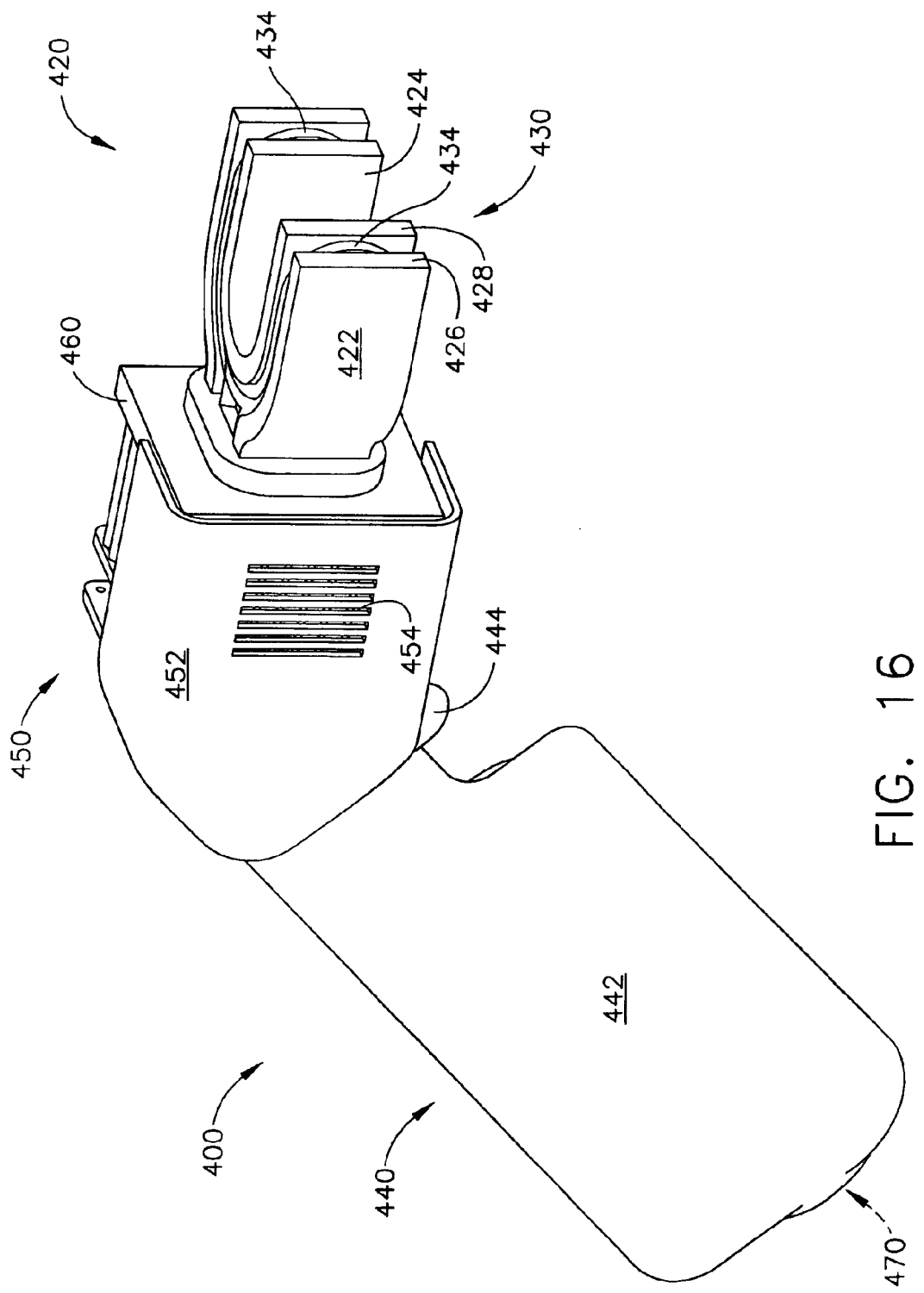
FIG. 16 is a perspective view in partial cross-section of a portable induction heating tool, constructed according to the principles of the present invention, depicting a fifth embodiment of a relatively lower-powered tool that includes a heat exchanger but no heat pipes.

Referring now to FIG. 16, a fifth embodiment of an inductive heating tool is generally designated by the reference numeral 400. This fifth embodiment includes a coil head 420, a heat exchanger portion 450, and a "far end" graspable portion 440. It can be easily seen that the heat exchanger portion 450 and the "far end" portion 440 have exchanged positions as compared to the fourth embodiment 300 illustrated on FIGS. 14–15.

The coil head 420 includes a work coil 434, an inner wall 424 that is substantially U-shaped, a set of outer walls 422, and a front face region 430. Each of the walls of the coil head include a front face surface, which is the surface 426 for the outer walls 422, and the surface 428 for the U-shaped inner wall 424.

The heat exchanger 450 includes an outer casing 452 which exhibits several slots or vents 454. The mounting or support wall between the coil head 420 and the heat exchanger 450 is designated by the reference numeral 460. The "far end" portion 440 includes an outer casing 442, and also has a receiving area 470 for receiving power, which could be an electrical receptacle that is used for plugging into an electrical cable (not shown on FIG. 16), or perhaps another type of structure for receiving or transferring power.

Figure 17:
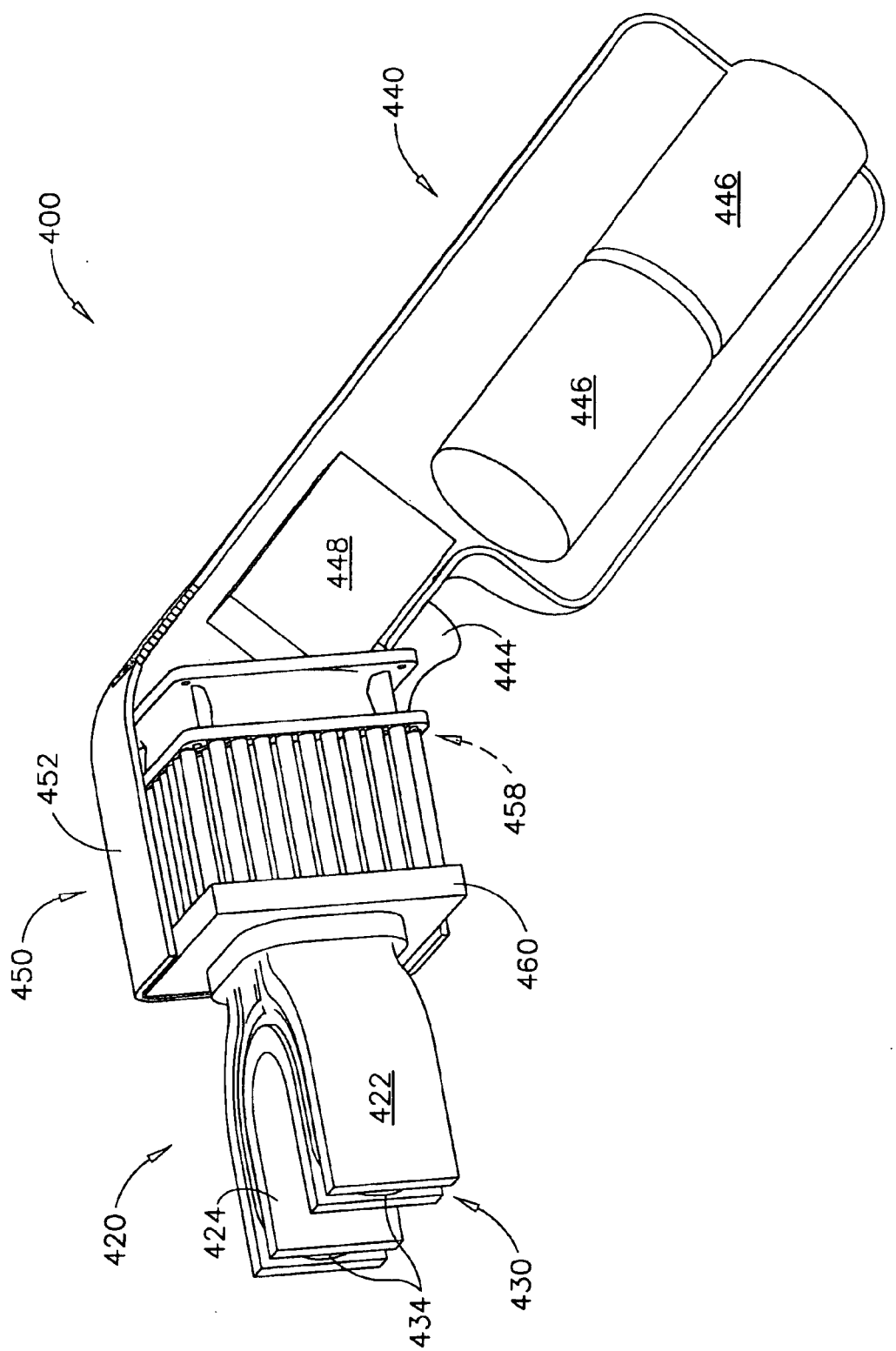
FIG. 17 is a perspective view in partial cross-section from the opposite side of the tool of FIG. 16.

Referring now to FIG. 17, the power capacitors 446 and an ON-OFF switch 448 are visible in the portion 440. ON-OFF switch 448 is actuated by a trigger button 444. FIG. 17 also shows the heat exchanger's internal components, which includes a heat sink 460 and a fan 458 that is mounted close to the heat sink.

As can be seen in FIG. 17, this fifth embodiment 400 includes no heat pipes whatsoever, and to achieve a better power rating, the heat exchanger has been mounted against the support wall 460 to achieve a better overall heat transfer characteristic by transferring heat away from the coil head 420 more quickly. In this configuration, the support wall 460 and the coil head surfaces are preferably at least somewhat heat conductive, so as to enable better heat transfer away from the coil head 420. In this design, the heat transfer capability would be approximately the same as in the fourth embodiment 300 that was illustrated in FIGS. 14–15 (e.g., 90 watts).

Figure 18:
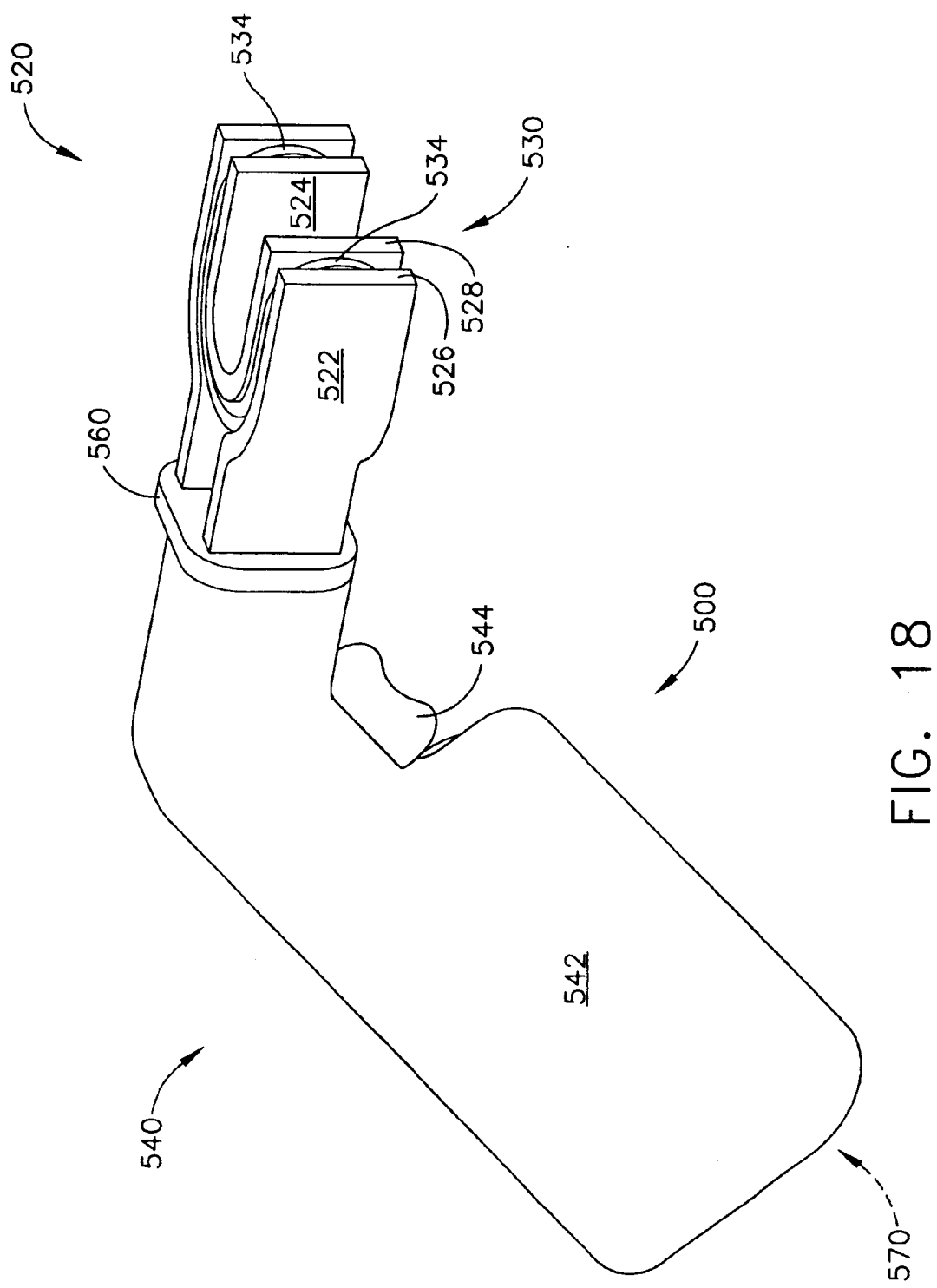
FIG. 18 is a perspective view in partial cross-section of a portable induction heating tool, constructed according to the principles of the present invention, depicting a sixth embodiment of a relatively lower-powered tool which includes no heat exchanger and no heat pipes.

Referring now to FIG. 18, a sixth embodiment of an induction heating tool is illustrated, and is generally designated by the reference numeral 500. This embodiment 500 includes a coil head 520 and a graspable "end portion" 540. Coil head 520 includes a generally U-shaped inner wall 524 and a set of outer walls 522, which end at a front face portion 530. The outer walls 522 exhibit front face surfaces at 526, while the inner wall 524 exhibits front face surfaces at 528.

Coil head 520 mounts to a support wall 560-that mounts to the end portion 540. End portion 540 exhibits an outer casing 542 and a trigger button 544. The end portion 540 also has a receiving area 570 for receiving power, which could be an electrical receptacle that is used for plugging into an electrical cable (not shown on FIG. 14), or perhaps another type of structure for receiving or transferring power.

The receiving areas 70, 170, 270, 370, 470, and 570 as a group are typically designed as receptacles to act as electrical connectors. In one preferred mode of the invention, these receptacles could comprise a recessed area in the housing or enclosure of the portable unit, with a number of protruding (or "male") prongs that are designed to fit into mating "female" slots at one end of a power cable, or an "umbilical" cable (see FIG. 10). However, for added reliability and safety, it will be understood that these receptacles could be eliminated entirely by permanently connecting such a power cable to the portable induction coil unit at the receiving area (70, 170, 270, etc.). Of course, if the power cable is subjected to considerable wear (which seems likely on many job sites), then a connecting-disconnecting mechanism such as the receptacle would appear to be a useful design solution. In one mode of the invention, the receptacle-power cable junction could be "locking" in nature to prevent untimely disconnections.

One alternative configuration of the present invention would be to re-configure the power receiving areas 70, 170, 270, 370, 470, and 570 to act as an antenna that could receive power in the form of electromagnetic energy, which then could be converted into electric current, for example. In such an alternative configuration, some type of power converter circuit would be necessary to generate current at a frequency that can drive, or is resonant for, the tank circuit of the induction coil and power capacitor(s) of the tool.

Figure 19:
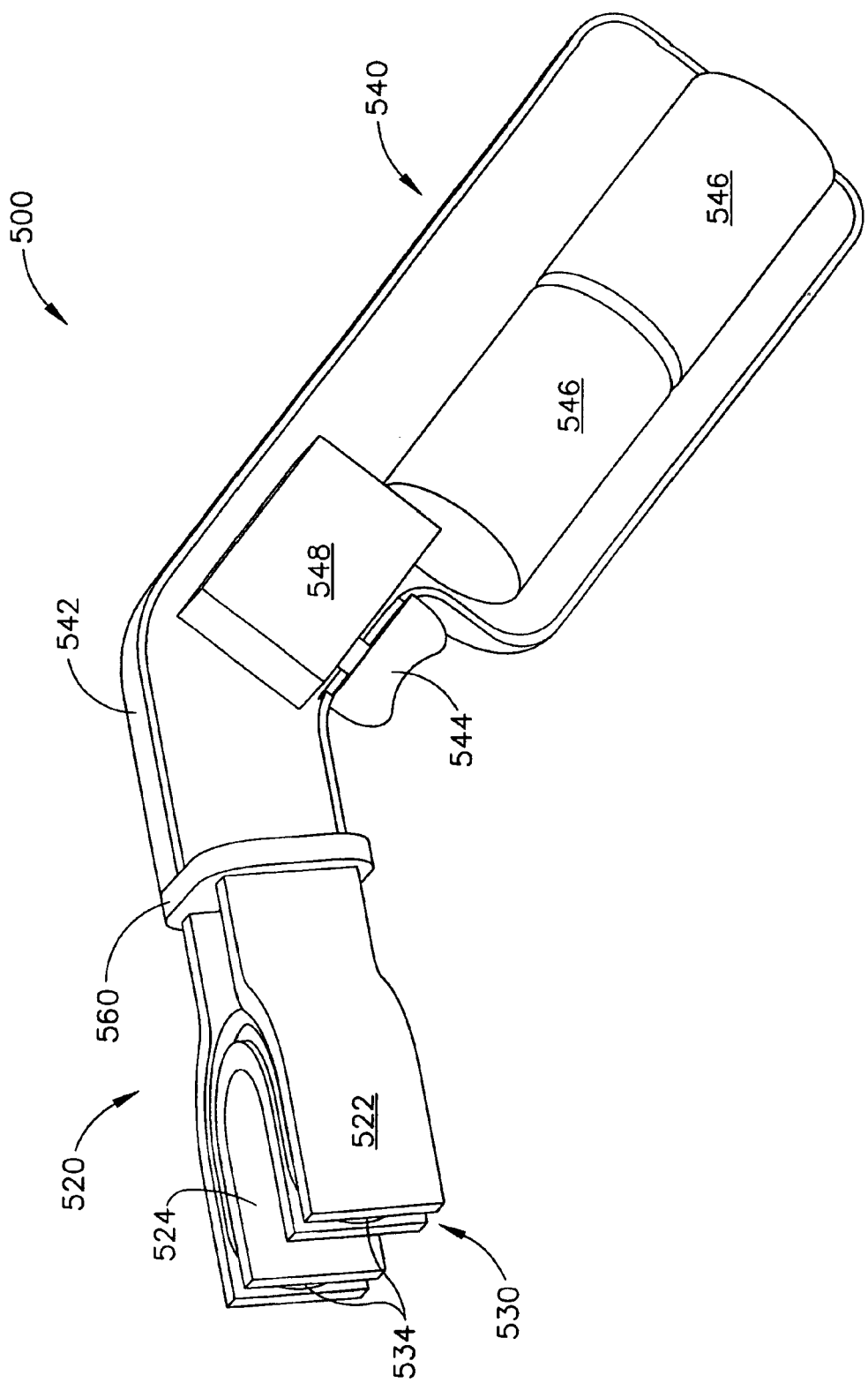
FIG. 19 is a perspective view in partial cross-section from the opposite side of the tool of FIG. 18.

Referring now to FIG. 19, the power capacitors 546 and an ON-OFF switch 548 are illustrated as being contained within the end portion 540. As can be seen in FIG. 19, there are no heat pipes, and moreover, there is no heat exchanger as such in this "basic unit" 500. This type of "basic" design would likely have the least power capability of any of the designs disclosed in this patent document, since without any heat pipes or a separate heat exchanger, the heat transfer rate from the coil head 520 likely would be at a rather minimal extent as compared to some of the other embodiments described herein.

Figure 20:
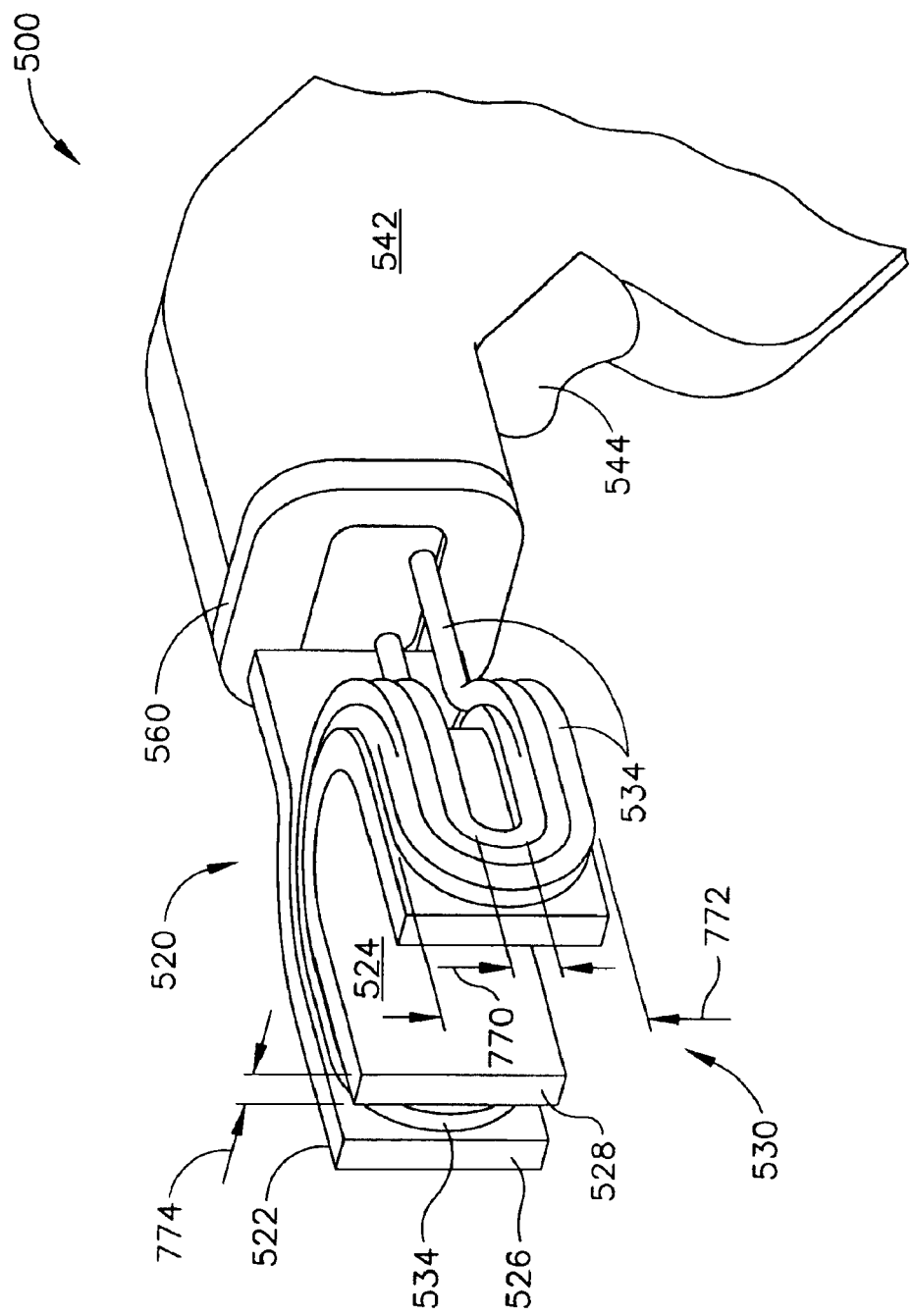
FIG. 20 is a perspective view from the front and right side of the coil head of the tool of FIG. 18, with one of the outer walls removed to show details of the coil head.

Referring now to FIG. 20, the "basic design" heating tool 500 is illustrated in a manner to show some of the details of the coil head 520. The Litz wire coil (or copper tubing) windings for work coil 534 are illustrated, and they pass through the support wall 560 into the end portion surrounded by the casing 542. The coil windings 534 are visible because one of the outer walls 522 has been removed from this view (i.e., the "near" wall).

The face area 530 of the coil head 520 is easily seen in FIG. 20, including the frontal or "face" area 526 of the outer wall 522 and the frontal or "face" area 528 of the inner wall 524. The overall U-shape of the inner wall 520 is also visible in this view. Some of the dimension characteristics of the coil 534 and the coil head region are illustrated on FIG. 20. For example, the induction coil 534 that is illustrated in FIG. 20 has a winding arrangement that can be referred to as a "racetrack" configuration, in which a single winding is "wrapped" back and forth in an overall oval-type fashion. In FIG. 20, there are two layers of the induction coil, and each layer has three turns of oval-shaped electrical conductor, all of which make up the overall single winding of the work coil 534. The "width" dimension of this racetrack coil configuration is given by the dimension 772 on FIG. 20, and a "gap" dimension between the innermost turn of the oval-shaped coil is illustrated by the dimension 770. Such a coil arrangement can also be referred to as a "single start, multi-turn" coil. It will be understood that other methods of winding the induction coil 534 could be used to construct a usable work coil, while still falling within the principles of the present invention.

The electrical insulators that make up the inner wall 524 and outer wall 522 also have important dimensions; more specifically the inner wall 524 will preferably be made as thin as possible, while still maintaining good insulation characteristics with regard to electrical resistance, and also while exhibiting either thermal insulation or thermal semi-conductive characteristics, depending on the type of configuration of the overall hand-held soldering tool. These considerations were discussed above, as to whether the inner wall 524 would be thermally insulative or thermally conductive (or perhaps thermally "semi-conductive"). In any event, the thickness of the inner wall is illustrated as the dimension 774 on FIG. 20. These dimensions described above will be discussed in greater detail below.

Referring now to FIG. 21, a yet further embodiment of the heating tool is illustrated, in which the induction coil is comprised of a heat pipe, rather than being comprised of a "standard" electrical conductor (such as Litz wire, or such as copper tubing with an insulative coating). The heat pipe embodiment of FIG. 21 is generally designated by the reference numeral 600, and would have a standard heating tool body (not shown in its entirety in this view), along with a casing 642 and some type of actuation button 644. The coil head is designated by the reference numeral 620, and includes a coil 634, which protrudes through a support wall 660. There is also an outer wall 622 and an inner wall 624, in which one side (i.e., the "near" side) of the outer wall 622 is removed, so that the coil windings 634 are readily visible. FIG. 21 also illustrates the frontal area 630 of the coil head 620, including a front face 626 of the outer wall 622, as well as a front face 628 of the inner wall 624.

In this embodiment 600 of FIG. 21, the induction coil 634 is made of a heat pipe that is wrapped in the racetrack coil arrangement (e.g., a single start, multi-turn coil), in which this heat pipe is one that is composed of an outer metallic casing, such as a copper casing or copper tubular material, although the metal should be electrically insulated. In this configuration, the coil 634 will be more or less "self-cooled," because the heat pipe device is one that automatically transfers heat away from its "hot end" toward its cooler end, by changes in phase. As discussed above, at the "hot end" the liquid within the heat pipe is vaporized, and as a gas travels toward the "cool end" where the gaseous phase material condenses to become a liquid, and then in that liquid phase travels back toward the "hot end," where the cycle is repeated.

It will be understood that the heating tool 600 could be made of the "basic design" configuration, in which there is no heat exchanger and no fan, or it could be built in a configuration in which either a fan is provided on the other side of the support wall 660, or in which both a fan and a heat exchanger are provided at the "far end" of the tool (which is not visible on FIG. 21).

Figure 22:
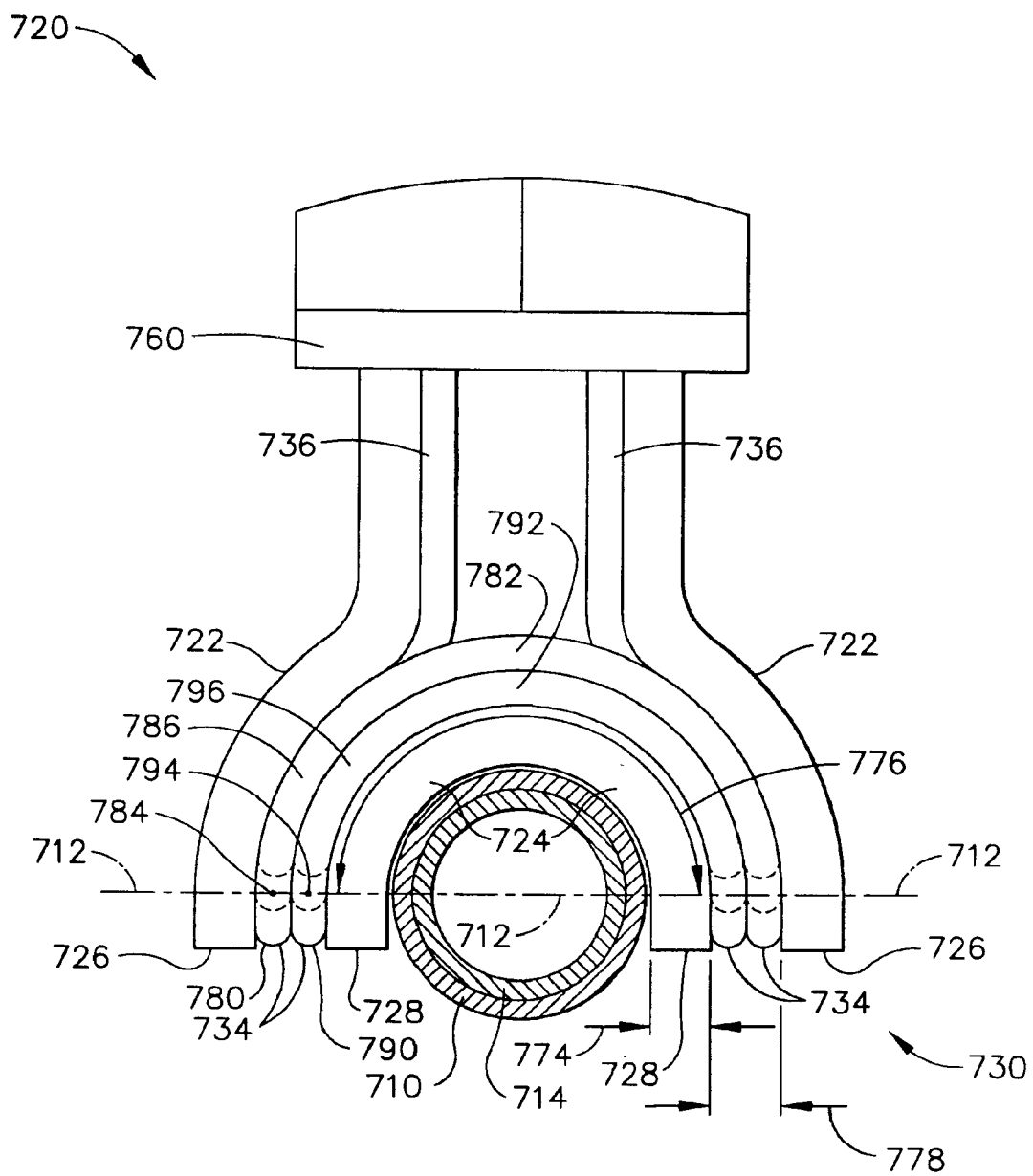
FIG. 22 is a top view of an alternative coil head design, usable in the heating tool of the present invention, in which the inner wall and coil profiles are substantially semi-circular; and showing the coil head partially surrounding a two-piece tubular workpiece (in cross-section) in position for being heated.

Referring now to FIG. 22, a top view of an alternative coil head profile of the induction tool of the present invention is illustrated. This coil head is generally designated by the reference numeral 720, and exhibits an outer wall 722, an inner wall 724, as well as the induction coil itself at 734. In FIG. 22, the inner wall 724 has its inner surface partially surrounding a tubular workpiece 710, and showing that the inner wall 724 is capable of coming into direct mechanical contact with the workpiece 710.

In most soldering or brazing operations, an outer coupler is used at the pipe joint. In FIG. 22, the coupler is designated at 710. The pipe section to be soldered or brazed is illustrated at 714. In general, the inner diameter of the coupler 710 is just barely greater than the outer diameter of the pipe 714, so a good mechanical coupling is achieved, both before and after the pipe 714 and coupler 710 are joined together. In FIG. 22, the inner wall 724 exhibits a semi-circular profile. FIG. 22 is showing the area of the coil head 720 in which the induction coil 734 has its main winding wrapped around the outer surface of the inner wall 724. For purposes of illustration, it is presumed that the coil 734 in FIG. 22 is wrapped in a manner similar to the work coils illustrated in FIG. 20, i.e., a racetrack-type configuration that is wrapped in two layers, in which each layer comprises three turns of the coil material itself. In FIG. 22, the inner layer is illustrated with its outermost turn at 790, its next inner (or middle) turn at 794, and its innermost "turn" at 796. All three of these "turns" wind around the outer surface of the inner wall 724, thereby forming a substantially semi-circular profile, including at the apex 792 of this inner layer of the winding.

The outer layer of the coil 734 has its outermost turn illustrated at 780, its middle turn at 784, and its innermost turn at 786. All three of these turns of the outer layer form a substantially semi-circular profile, which has an apex at the reference numeral 782. If this coil 734 is indeed constructed of a single winding, then it will be understood that all of the turns of both layers are electrically connected in series, thereby forming a single electrical winding of the induction coil 734. The coil conductors also extend back toward the support wall 760, and these portions of the coil are illustrated at 736, as two parallel electrical conductors. Of course, the term "parallel" in the previous sentence is referring to its mechanical structure, and it will be understood that these portions 736 are electrically connected in series, as they are all part of the single coil winding of the coil 734.

It will be understood that an alternative coil could easily be constructed in which there is more than one parallel winding, and in fact the coil of FIG. 22 could easily be manufactured with two parallel windings (i.e., electrically in parallel), and in that situation the inner winding would comprise the inner layer (i.e., the coil turns 790, 794, and 796) while the second winding could comprise the outer layer (i.e., the coil turns 780, 784, and 786).

The coil head 720 includes a coil face region 730, and this face region 730 would have a frontal face or surface 726 for the outer wall 722, and a frontal face or surface 728 for the inner wall 724. As seen in FIG. 22, the inner and outer walls 728 and 726, respectively, both extend somewhat past the outermost dimensions of the coil 734, which are illustrated at 780 and 790 on FIG. 22. This is arranged so as to protect the electrical conductors that make up the coil 734.

Some of the mechanical dimensions of the coil head 720 will now be discussed. A diametrical line 712 is illustrated on FIG. 22 as running through the center of the three concentric circles that make up the inner and outer diameters of the tubular workpiece 710 and 714. In a preferred embodiment of the present invention, the induction coil 734 will be wrapped in a semicircle that runs from one end of the coil where it intersects this diametrical line 712, to the other end of the coil which again intersects the diametrical line 712 on the opposite side of the workpiece 710, 714. However, if the coil 734 is wrapped in more than one layer, and also if it is wrapped in more than one turn, then it is virtually impossible for every turn of the coil 734 to come up to this diametrical line 712 and stop direction at that line. Therefore, in the example illustrated on FIG. 22, it is the middle turn of the (three-turn) layers that most centrally intersects the diametrical line 712, which comprises the middle turns 784 and 794. It has been found in prototypical induction heating coil devices that this semi-circular profile for the induction coil 734 is a very efficient design for heating the tubular workpiece 710.

On FIG. 22, an arcuate dimension 776 is illustrated as being drawn along the outer surface of the inner wall 724. This outer wall dimension 776 is illustrating a desired dimension for the coil 734, as it contacts the outer surface of the inner wall 724. This arcuate dimension is referred to herein as the "length" of the induction coil 734. Also illustrated on FIG. 22 is a dimension 774, which was also seen on FIG. 20, and represents the thickness of the inner wall 724.

In a preferred embodiment of the induction coil used in the heating tool of the present invention, the coil 734 is constructed in a racetrack configuration, and the dimensions of the coil 734 are selected to optimize the heating of the workpiece. In general, the induction coil 734 should be wrapped as close to the workpiece tube 710 as possible. This of course means that the insulating member that comprises the inner wall 724 should be constructed to be as thin as possible. The "length" of the coil (i.e., dimension 776 on FIG. 22) should be approximately half of the circumference of the outer surface of the tubular workpiece 710, plus a times the thickness of the inner wall 724 (i.e., the thickness dimension 774). In this manner, the ends of the induction coil 734 will essentially align with the centerline of the tubular workpiece (i.e., the diametrical line 712 on FIG. 22). It is not necessary for these dimensional criteria to be precisely adhered to, and minor alterations can be made while still achieving good efficiency.

Other dimensional considerations important in the present invention include the considerations of the "width" of the coil, as well as the "gap" of the coil. These are the dimensions 722 and 770, respectively, depicted on FIG. 20. The induction coil should substantially be as wide as the length of the section of the tubular workpiece that is to be heated. (This is the dimension 772 on FIG. 20.) The gap dimension in general should be about half of the width dimension of the induction coil. Therefore, the dimension 770 should be about one-half of the dimension 772, with regard to the dimensions illustrated on FIG. 20. As noted above, it is not necessary for these dimensional criteria to be precisely adhered to, and minor alterations can be made while still achieving good efficiency.

The overall thickness of the induction coil 734 is a trade-off between the inductive coupling to the tubular workpiece and the coil's resistive losses. Good results in a prototype coil head have been obtained when the coil's thickness was approximately equal to the radius of the tubular workpiece that is to be heated. On FIG. 22, the coil "thickness" is a dimension 778, which is the distance between the inner surface of the outer wall 722 and the outer surface of the inner wall 724.

One prototypical coil that works well in heating metal pipes is one that exhibited a width dimension of 1.7 inches, a gap dimension of 0.76 inches, an inner wall (insulating member) thickness of 0.075 inches, and a coil "length" of 1.728 inches. The "target" (or workpiece) was a copper coupler having a 0.95 inch outer diameter and a linear dimension of about 1.6 inches. The coupler surrounds a copper pipe, or two sections of copper pipe that are to be joined by a soldering process. The coil head having the above dimensions was capable of heating the entire coupler, and of forming two solder bonds simultaneously, one between each pipe section and the coupler. As can be seen, FIG. 22 is not to scale, especially with respect to the dimensions given for the above prototype; the inner wall 724 in particular is illustrated as being "thicker" than typical.

Figure 23:
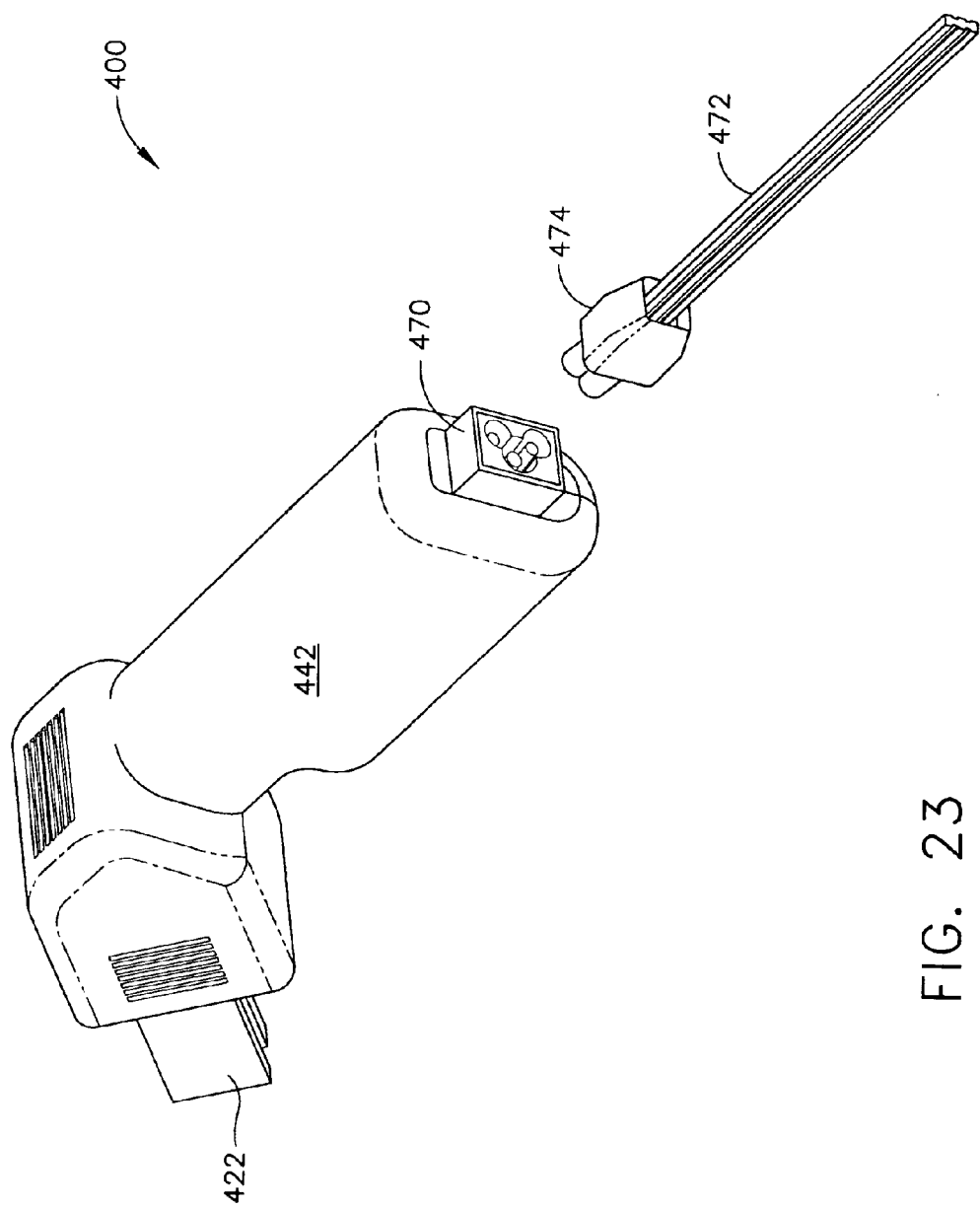
FIG. 23 is a perspective view from the rear and right side of the tool of FIG. 16, showing a receptacle.

Referring now to FIG. 23, the heating tool 400 is depicted from the rear so as to show the electrical receptacle 470. As can be seen in this view, a power cord 472 includes a plug 474 that can be connected into receptacle 470.

It will be understood that the coil head shape of all of the coil heads disclosed in this patent document are designed for easy installation around a rather lengthy pipe, and then after a soldering or brazing operation has occurred, the coil head may be easily removed from the joined pipe sections. This is for ease of use by plumbers or pipefitters, and is an advantage that is not enjoyed by all such soldering or brazing tools known in the prior art. It will also be understood that the exact dimensions of the coil head can be readily changed for different pipe sizes (or different coupler sizes), without departing from the principles of the present invention. As described above, the dimensions of the induction coils have a generally preferred relationship as compared to the dimensions of the workpiece to be soldered or brazed, however, the exact dimensions can vary significantly while still using other principles of the present invention.

It will be further understood that the embodiments illustrated in FIGS. 1–22 could have further modifications thereto, and also various other combinations of components and locations of components than illustrated in these drawings, all without departing from the principles of the present invention. In addition, other applications for this type of induction heating tool design can readily be found, while still falling within the teachings of the present invention.

It will also be understood that the operating frequency of the load current that drives the induction coil (e.g., one of the coils 34, 134, 234, 334, 434, 534, or 634) will be important with respect to a resonant frequency exhibited by the tank circuit that includes the induction coil and the power capacitor (e.g., one of the capacitors 46, 146, 246, 346, 446, or 546). If possible, the load current will be supplied at the actual resonant frequency, which is possible if an output power oscillator is used that automatically drives this load current at the circuit's resonant frequency. If the output current is not provided at the actual resonant frequency, then the efficiency of the electrical circuit will be reduced. Certain pulse power output circuits can drive tank circuits at a very low frequency, almost down to DC (zero Hertz).

The present invention can work well at various operating frequencies, essentially as low as 10 Hertz up to as high as visual light frequencies. A more preferred range of operating frequencies is from a few kHz up to 2 MHz, inclusive; a yet more preferred range of operating frequencies is from 10 kHz through 300 kHz, inclusive; and a still more preferred range of operating frequencies is from 50 kHz through 300 kHz, inclusive.

It will be understood that the present invention can well operate without the inclusion of a power capacitor (e.g., one of the capacitors 46, 146, 246, 346, 446, or 546) within the hand-held portion of an overall induction heating system. The inclusion of the capacitor has a beneficial effect, of course: that of minimizing the total current running between the induction coil and the capacitor, which allows for a smaller electrical conductor for that run of wiring. The inclusion of the capacitor also has a detrimental effect: it increases the cost of the hand-held unit, and more weight is added to the hand-held unit, along with an increased space needed to enclose the capacitor(s). It must be said, however, that the inclusion of such a power capacitor usually provides more benefit than detriment.

It will further be understood that the present invention is not limited to any particular type of soldering compound (with or without self-contained flux), or any particular type of brazing compound, and thus is not limited to any particular operating temperature for the heating events. Moreover, the bonding compound used in joining pipes, or other longitudinal objects, does not necessarily have to be comprised of a soldering or brazing compound; certain hi-temperature epoxies could be quickly cured using the heating (and bonding) tool of the present invention.

All documents cited in the Detailed Description of the Invention are, in relevant part., incorporated herein by reference; the citation of any document is not to be construed as an admission that it is prior art with respect to the present invention.

The foregoing description of a preferred embodiment of the invention has been presented for purposes of illustration and description. It is not intended to he exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

What is claimed is:

1. An induction heating apparatus, comprising:
   (a) a head portion, comprising: (i) an outer wall, (ii) an inner wall, (iii) an induction coil disposed between said inner and outer walls, wherein: (iv) said inner wall forms an opening having substantially a U-shape as its interior surface, and (v) said inner wall and said outer wall are substantially rigid, and do not exhibit movable portions with respect to one another; and
   (b) a gripable portion, comprising: (i) an enclosure surface, (ii) an electrical switching circuit, (iii) a receiving area that receives power for energizing said induction coil, and (iv) at least one electrical conductor to carry said power between said induction coil and said receiving area.

2. The induction heating apparatus as recited in claim 1, wherein said receiving area comprises one of: (a) a receptacle; (b) at least one electrical conductor that runs through said enclosure surface; and (c) an antenna.

3. The induction heating apparatus as recited in claim 1, further comprising a mounting wall between said head portion and said gripable portion, said at least one electrical conductor running through said mounting wall.

4. The induction heating apparatus as recited in claim 1, further comprising at least one capacitor that is connected in parallel with said induction coil.

5. The induction heating apparatus as recited in claim 1, wherein said induction coil and said at least one electrical conductor comprise at least one of: (a) Litz wire; (b) electrically-conductive tubing; and (c) at least one heat pipe.

6. The induction heating apparatus as recited in claim 1, wherein said U-shaped opening is sized and shaped such that said inner wall of said head portion may be placed so as to partially surround a workpiece to be inductively heated by said induction coil.

7. The induction heating apparatus as recited in claim 6, wherein said workpiece comprises at least two elongated pipe sections that are to be soldered or brazed to form a joint; and wherein said U-shaped opening is sized and shaped such that said head portion is removed from the area of the joint without disturbing the joined pipe sections, and without requiring any portion of said induction heating apparatus to change shape.

8. The induction heating apparatus as recited in claim 1, wherein said electrical switching circuit comprises one of: (a) a finger-actuated switch, (b) a foot-actuated switch, (c) an electronic switch that is controlled by a remote device, and (d) a proximity switch.

9. The induction heating apparatus as recited in claim 1, wherein said U-shaped inner wall exhibits a substantially semi-circular shape, and said induction coil exhibits a substantially semi-circular shape.

10. An induction heating apparatus, comprising:
(a) a head portion, comprising: (i) an outer wall, (ii) an inner wall, and (iii) an induction coil disposed between said inner and outer walls, wherein said inner wall forms a surface exhibiting an opening that may be placed such that the inner wall partially surrounds a workpiece; and
(b) a gripable portion, comprising: (i) an enclosure surface, (ii) an electrical switching circuit, (iii) a receiving area that receives power for energizing said induction coil, (iv) at least one electrical conductor to carry said power between said induction coil and said receiving area; and (v) at least one heat pipe for transferring thermal energy from said head portion.

11. The induction heating apparatus as recited in claim 10, wherein said receiving area comprises one of: (a) a receptacle; (b) at least one electrical conductor that runs through said enclosure surface; and (c) an antenna.

12. The induction heating apparatus as recited in claim 10, further comprising a mounting wall between said head portion and said gripable portion, said at least one electrical conductor running through said mounting wall.

13. The induction heating apparatus as recited in claim 12, wherein said at least one heat pipe runs through said mounting wall and into said head portion.

14. The induction heating apparatus as recited in claim 13, wherein said at least one heat pipe is positioned within said head portion at a location in which said at least one heat pipe receives substantially minimal magnetic flux when said induction coil is energized.

15. The induction heating apparatus as recited in claim 12, wherein said at least one heat pipe runs up to said mounting wall but does not run through said mounting wall and into said head portion.

16. The induction heating apparatus as recited in claim 10, further comprising: a heat exchanger portion to assist in transferring thermal energy from said head portion.

17. The induction heating apparatus as recited in claim 16, wherein said head portion is positioned at a first end of the gripable portion at said mounting wall, said heat exchanger is positioned at an second, opposite end of the gripable portion, and said at least one heat pipe runs from said mounting wall to said heat exchanger through said gripable portion.

18. The induction heating apparatus as recited in claim 10, further comprising at least one capacitor that is connected in parallel with said induction coil.

19. The induction heating apparatus as recited in claim 10, wherein said induction coil and said at least one electrical conductor comprise at least one of: (a) Litz wire; and (b) electrically-conductive tubing; and (c) at least one heat pipe.

20. The induction heating apparatus as recited in claim 10, wherein said at least one heat pipe does not carry electrical power.

21. The induction heating apparatus as recited in claim 10, wherein said electrical switching circuit comprises one of: (a) a finger-actuated switch, (b) a foot-actuated switch, (c) an electronic switch that is controlled by a remote device, and (d) a proximity switch.

22. The induction heating apparatus as recited in claim 10, wherein said inner wall and said induction coil both exhibit a shape that is one of: (a) substantially semi-circular in profile; and (b) substantially semi-circular with two parallel extensions, thereby forming a U-shaped profile.

23. An induction heating apparatus, comprising:
(a) a head portion, comprising: (i) an outer wall, (ii) an inner wall, (iii) an induction coil disposed between said inner and outer walls, wherein said inner wall forms an opening that may be placed so as to partially surround a workpiece;
(b) a gripable portion, comprising: (i) an enclosure surface, (ii) an electrical switching circuit, (iii) a receiving area that receives power for energizing said induction coil, (iv) at least one electrical conductor to carry said power between said induction coil and said receiving area; and
(c) a heat exchanger portion to assist in transferring thermal energy from said head portion.

24. The induction heating apparatus as recited in claim 23, wherein said receiving area comprises one of: (a) a receptacle; (b) at least one electrical conductor that runs through said enclosure surface; and (c) an antenna.

25. The induction heating apparatus as recited in claim 23, further comprising a mounting wall between said head portion and said gripable portion, said at least one electrical conductor running through said mounting wall.

26. The induction heating apparatus as recited in claim 25, wherein:
said head portion is positioned at a first end of the gripable portion at said mounting wall, at a first side of said mounting wall; and
said heat exchanger is positioned proximal to said first end of the gripable portion, at a second, opposite side of said mounting wall.

27. The induction heating apparatus as recited in claim 26, wherein said mounting wall comprises a substance that has heat-conductive properties.

28. The induction heating apparatus as recited in claim 25, further comprising: at least one heat pipe for transferring thermal energy from said head portion; and
wherein said head portion is positioned at a first end of the gripable portion at said mounting wall, said heat exchanger is positioned at an second, opposite end of the gripable portion, and said at least one heat pipe runs from said mounting wall to said heat exchanger through said gripable portion.

29. The induction heating apparatus as recited in claim 28, wherein said at least one heat pipe runs through said mounting wall and into said head portion.

30. The induction heating apparatus as recited in claim 29, wherein said at least one heat pipe is positioned within said head portion at a location in which said at least one heat pipe receives substantially minimal magnetic flux when said induction coil is energized.

31. The induction heating apparatus as recited in claim 29, wherein said mounting wall comprises a substance that has heat-insulative properties.

32. The induction heating apparatus as recited in claim 28, wherein said at least one heat pipe does not carry electrical power.

33. The induction heating apparatus as recited in claim 28, wherein said at least one heat pipe runs up to said mounting wall but does not run through said mounting wall and into said head portion.

34. The induction heating apparatus as recited in claim 33, wherein said mounting wall comprises a substance that has heat-conductive properties.

35. The induction heating apparatus as recited in claim 23, further comprising at least one capacitor that is connected in parallel with said induction coil.

36. The induction heating apparatus as recited in claim 23, wherein said induction coil and said at least one electrical conductor comprise at least one of: (a) Litz wire; and (b) electrically-conductive tubing; and (c) at least one heat pipe.

37. The induction heating apparatus as recited in claim 36, wherein said at least one heat pipe carries the electrical load current of said induction coil.

38. The induction heating apparatus as recited in claim 23, wherein said electrical switching circuit comprises one of: (a) a finger-actuated switch, (b) a foot-actuated switch, (c) an electronic switch that is controlled by a remote device, and (d) a proximity switch.

39. The induction heating apparatus as recited in claim 23, wherein said inner wall and said induction coil both exhibit a shape that is one of: (a) substantially semi-circular in profile; and (b) substantially semi-circular with two parallel extensions, thereby forming a U-shaped profile.

40. A coil head for an induction heating apparatus, said coil head comprising:
   (a) an outer member;
   (b) an inner member, said inner member having a first arcuate surface along a first, inner side wall, and a second arcuate surface along a second, outer side wall, said first and second side walls being of a shape such that said inner member exhibits a profile that is substantially semi-circular; and
   (c) an induction coil disposed between said inner and outer members, said induction coil comprising an electrical winding that is substantially arcuate of a semi-circular profile, such that it is substantially positioned along the second, outer side wall of said inner member; said induction coil exhibiting a length dimension along its substantially semi-circular profile, between a first end and a second end of said induction coil;
   wherein:
   when said inner member is moved proximal to a cylindrical workpiece that is to be heated, in which said cylindrical workpiece exhibits a circumference dimension along its outer surface, said length dimension of the induction coil is of a distance that is substantially one-half of said workpiece circumference dimension.

41. The coil head as recited in claim 40, wherein said length dimension of the induction coil is of a distance such that its first end substantially intersects a diametrical line that runs through a centerline of said cylindrical workpiece proximal to an outer surface at a first side of said workpiece, and its second end substantially intersects the same diametrical line proximal to said outer surface at a second, opposite side of said workpiece.

42. The coil head as recited in claim 41, wherein said length dimension of the induction coil is substantially equal to: {(an outer diameter of said cylindrical workpiece)+(2× a thickness of said inner member measured from its first, inner side wall to its second, outer side wall)}×(π/2).

43. The coil head as recited in claim 42, wherein said outer surface of the workpiece comes into direct contact with the first, inner side wall of said inner member.

44. The coil head as recited in claim 41, wherein:
   said induction coil comprises multiple individual turns;
   at least one of said multiple individual turns exhibits a third end and a fourth end, its third end substantially intersects said diametrical line at a first side of ,;aid workpiece, and its fourth end substantially intersects the same diametrical line at a second, opposite side of said workpiece; and
   at least one other of said multiple individual turns exhibits a fifth end and a sixth end, its fifth end does not substantially intersect said diametrical line at the first side of said workpiece, and its sixth end does not substantially intersect the same diametrical line at the second, opposite side of said workpiece.

45. The coil head as recited in claim 40, wherein said induction coil is of a racetrack configuration.

46. The coil head as recited in claim 40, wherein said outer member at least partially covers said induction coil.

47. The coil head as recited in claim 40, wherein said induction coil exhibits a width dimension that runs substantially perpendicular to said length dimension;
   wherein:
   when said inner member is moved proximal to a cylindrical workpiece that is to be heated, and said cylindrical workpiece exhibits a longitudinal axis, a longitudinal portion of said cylindrical workpiece is heated to an extent along said longitudinal axis that is substantially equal to said width dimension of the induction coil.

48. The coil head as recited in claim 40, wherein said cylindrical workpiece comprises:
   a cylindrical coupler of a first outer diameter and a first inner diameter, and a first longitudinal length; a first cylindrical pipe section of a second outer diameter; a second cylindrical pipe section of a third outer diameter, which is substantially equal to said second outer diameter; wherein said first inner diameter of the coupler is at least as large as said second and third outer diameters of the first and second pipe sections;
   wherein:
   (a) said first and second pipes sections are substantially abutted together such that their longitudinal axes are substantially co-linear, and said coupler is placed over both said first and second pipe sections;
   (b) a bonding compound is introduced between said coupler and at least one of the first and second pipe sections;
   (c) said coil head is placed at a position proximal to said coupler; and
   (d) said induction coil is energized to heat said coupler and said bonding compound, thereby forming a bond between said coupler and said at least one of the first and second pipe sections.

49. The coil head as recited in claim 48, wherein said induction coil exhibits a coil width dimension that runs substantially perpendicular to said coil length dimension, and said coil width dimension is greater than or equal to said first longitudinal length of the coupler, thereby allowing said induction coil to simultaneously heat the entire coupler.

50. The coil head as recited in claim 40, wherein:

said induction coil exhibits a thickness dimension that represents a distance between said outer side wall of the inner member and an inner side wall of said outer member; and said coil thickness dimension is substantially equal to a radius of said workpiece along its outer diameter.

51. The coil head as recited in claim 40, wherein:

(a) said induction coil exhibits "X" watts of resistive losses when the coil is energized;

(b) said induction coil delivers "Y" watts of power to said workpiece when the coil is energized;

(c) an efficiency of the coil head is equal to Y divided by (X+Y); and (d) said efficiency of the coil head is greater than 50%.

52. The coil head as recited in claim 51, wherein: said efficiency of the coil head is greater than 60%.

* * * * *